United States Patent
Ryerson et al.

(10) Patent No.: US 11,032,283 B2
(45) Date of Patent: *Jun. 8, 2021

(54) MANAGING USE OF NETWORK RESOURCES

(71) Applicant: BlackBerry Limited, Waterloo (CA)

(72) Inventors: Christopher Ryerson, Kanata (CA); Christopher Lyle Bender, Kitchener (CA); Michael Thomas Winkler, Hanover, PA (US); David Bukurak, Ottawa (CA); Benjamin Altman, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,911

(22) Filed: Jun. 13, 2016

(65) Prior Publication Data
US 2016/0373452 A1 Dec. 22, 2016

Related U.S. Application Data

(63) Continuation of application No. 13/529,509, filed on Jun. 21, 2012, now Pat. No. 9,369,466.

(51) Int. Cl.
*G06F 15/16* (2006.01)
*H04L 29/06* (2006.01)
(Continued)

(52) U.S. Cl.
CPC ............. *H04L 63/10* (2013.01); *H04L 47/70* (2013.01); *H04L 63/08* (2013.01); *H04L 63/101* (2013.01);
(Continued)

(58) Field of Classification Search
CPC ....... H04L 63/101; H04L 63/08; H04L 63/10; H04L 47/70; H04W 12/08
(Continued)

(56) References Cited

U.S. PATENT DOCUMENTS

| 4,815,128 A | 3/1989 | Malek |
| 4,837,812 A | 6/1989 | Takahashi et al. |

(Continued)

FOREIGN PATENT DOCUMENTS

| CA | 2505343 | 6/2010 |
| CN | 1831833 | 9/2006 |

(Continued)

OTHER PUBLICATIONS

Bugiel, Sven, Lucas Davi, Alexandra Dmitrienko, Stephan Heuser, Ahmad-Reza Sadeghi, and Bhargava Shastry. "Practical and lightweight domain isolation on android." In Proceedings of the 1st ACM workshop on Security and privacy in smartphones and mobile devices, pp. 51-62. ACM, 2011.*

(Continued)

*Primary Examiner* — Suraj M Joshi
*Assistant Examiner* — Melaku Y Habtemariam
(74) *Attorney, Agent, or Firm* — Fish & Richardson P.C.

(57) ABSTRACT

Some aspects of what is described here relate to managing the use of network resources on a mobile device. User input received at the device indicates whether to allow an application associated with a first perimeter on the device to access a network resource associated with a second perimeter on the device. For example, in some instances user input may indicate whether to allow data from applications associated with a personal perimeter on the device to be transmitted over an enterprise communication system. When outbound data associated with the first perimeter are received, the device determines, according to the indication from the user input, whether to route the outbound data to the network resource associated with the second perimeter.

15 Claims, 5 Drawing Sheets

(51) Int. Cl.
*H04L 12/911* (2013.01)
*H04W 12/088* (2021.01)
*H04W 12/084* (2021.01)

(52) U.S. Cl.
CPC ....... *H04W 12/084* (2021.01); *H04W 12/088* (2021.01)

(58) Field of Classification Search
USPC .................................................. 709/223–226
See application file for complete search history.

(56) References Cited

U.S. PATENT DOCUMENTS

| | | | |
|---|---|---|---|
| 4,945,556 A | 7/1990 | Namekawa | |
| 4,972,457 A | 11/1990 | O'Sullivan | |
| 4,991,197 A | 2/1991 | Morris | |
| 5,220,604 A | 6/1993 | Gasser et al. | |
| 5,408,520 A | 4/1995 | Clark et al. | |
| 5,606,594 A | 2/1997 | Register et al. | |
| 5,774,551 A | 6/1998 | Wu et al. | |
| 5,802,483 A | 9/1998 | Morris | |
| 5,826,265 A | 10/1998 | Van Huben et al. | |
| 5,850,515 A | 12/1998 | Lo et al. | |
| 5,864,683 A | 1/1999 | Boebert et al. | |
| 5,864,765 A | 1/1999 | Barvesten | |
| 5,933,412 A | 8/1999 | Chowdhury et al. | |
| 5,987,440 A | 11/1999 | O'Neil et al. | |
| 5,987,611 A | 11/1999 | Freund | |
| 6,052,735 A | 4/2000 | Ulrich et al. | |
| 6,088,693 A | 7/2000 | Van Huben et al. | |
| 6,105,132 A | 8/2000 | Fritch et al. | |
| 6,125,447 A | 9/2000 | Gong | |
| 6,131,136 A | 10/2000 | Liebenow et al. | |
| 6,219,694 B1 | 4/2001 | Lazaridis et al. | |
| 6,233,446 B1 | 5/2001 | Do | |
| 6,243,756 B1 | 6/2001 | Whitmire et al. | |
| 6,253,326 B1 | 6/2001 | Lincke et al. | |
| 6,285,889 B1 | 9/2001 | Nykanen et al. | |
| 6,292,798 B1 | 9/2001 | Dockter et al. | |
| 6,343,313 B1 | 1/2002 | Salesky et al. | |
| 6,351,816 B1 | 2/2002 | Mueller et al. | |
| 6,360,322 B1 | 3/2002 | Grawrock | |
| 6,405,202 B1 | 6/2002 | Britton et al. | |
| 6,408,336 B1 | 6/2002 | Schneider et al. | |
| 6,412,070 B1 | 6/2002 | Van Dyke et al. | |
| 6,490,289 B1 | 12/2002 | Zhang et al. | |
| 6,505,200 B1 | 1/2003 | Ims | |
| 6,516,421 B1 | 2/2003 | Peters | |
| 6,539,385 B1 | 3/2003 | Pollack et al. | |
| 6,546,554 B1 | 4/2003 | Schmidt et al. | |
| 6,629,246 B1 | 9/2003 | Gadi | |
| 6,647,388 B2 | 11/2003 | Numao et al. | |
| 6,668,323 B1 | 12/2003 | Challener et al. | |
| 6,745,047 B1 | 6/2004 | Karstens et al. | |
| 6,748,543 B1 | 6/2004 | Vilhuber | |
| 6,757,821 B1 | 6/2004 | Akiyama et al. | |
| 6,772,350 B1 | 8/2004 | Belani et al. | |
| 6,775,536 B1 | 8/2004 | Geiger et al. | |
| 6,785,810 B1 | 8/2004 | Lirov et al. | |
| 6,795,688 B1 | 9/2004 | Plasson et al. | |
| 6,795,967 B1 | 9/2004 | Evans et al. | |
| 6,799,208 B1 | 9/2004 | Sankaranarayan | |
| 6,832,256 B1 | 12/2004 | Toga | |
| 6,886,038 B1 | 4/2005 | Tabbara et al. | |
| 6,895,502 B1 | 5/2005 | Fraser et al. | |
| 6,901,429 B2 | 5/2005 | Dowling | |
| 6,944,677 B1 | 9/2005 | Zhao | |
| 6,957,330 B1 | 10/2005 | Hughes | |
| 6,976,241 B2 | 12/2005 | Cruz et al. | |
| 6,978,385 B1 | 12/2005 | Cheston et al. | |
| 6,999,562 B2 | 2/2006 | Winick | |
| 7,042,988 B2 | 5/2006 | Juitt et al. | |
| 7,076,239 B2 | 7/2006 | Kirkup et al. | |
| 7,076,797 B2 | 7/2006 | Loveland | |
| 7,146,638 B2 | 12/2006 | Malcolm | |
| 7,185,192 B1 | 2/2007 | Kahn | |
| 7,187,678 B2 | 3/2007 | Cunetto et al. | |
| 7,233,786 B1 | 6/2007 | Harris | |
| 7,246,374 B1 | 7/2007 | Simon et al. | |
| 7,315,750 B2 | 1/2008 | Chou et al. | |
| 7,317,699 B2 | 1/2008 | Godfrey | |
| 7,330,712 B2 | 2/2008 | Kirkup et al. | |
| 7,331,058 B1 | 2/2008 | Gladney | |
| 7,353,533 B2 | 4/2008 | Wright | |
| 7,400,878 B2 | 7/2008 | Hassan et al. | |
| 7,437,362 B1 | 10/2008 | Ben-Natan | |
| 7,469,417 B2 | 12/2008 | Fearnley et al. | |
| 7,496,954 B1 | 2/2009 | Himawan | |
| 7,515,717 B2 | 4/2009 | Doyle et al. | |
| 7,526,800 B2 | 4/2009 | Wright et al. | |
| 7,574,200 B2 | 8/2009 | Hassan et al. | |
| 7,603,466 B2 | 10/2009 | Kilian-Kehr et al. | |
| 7,620,391 B2 | 11/2009 | Itzkovitz | |
| 7,689,653 B2 | 3/2010 | Cohen | |
| 7,721,087 B1 | 5/2010 | DiPasquo et al. | |
| 7,734,284 B2 | 6/2010 | Adams et al. | |
| 7,751,331 B1 | 7/2010 | Blair et al. | |
| 7,765,185 B2 | 7/2010 | Rangadass | |
| 7,793,355 B2 | 9/2010 | Little et al. | |
| 7,869,789 B2 | 1/2011 | Hassan et al. | |
| 7,886,053 B1 | 2/2011 | Newstadt et al. | |
| 7,890,627 B1 | 2/2011 | Thomas | |
| 7,917,963 B2 | 3/2011 | Goyal et al. | |
| 7,921,452 B2 | 4/2011 | Ridlon et al. | |
| 7,950,066 B1 | 5/2011 | Zuili | |
| 8,005,469 B2 | 8/2011 | Adams et al. | |
| 8,041,346 B2 | 10/2011 | Tyhurst | |
| 8,060,936 B2 | 11/2011 | Mahaffey et al. | |
| 8,074,078 B2 | 12/2011 | Brown et al. | |
| 8,087,067 B2 | 12/2011 | Mahaffey et al. | |
| 8,108,933 B2 | 1/2012 | Mahaffey | |
| 8,121,638 B2 | 2/2012 | Gisby | |
| 8,122,362 B2 | 2/2012 | Brush | |
| 8,145,493 B2 | 3/2012 | Cross, Jr. | |
| 8,180,893 B1 | 5/2012 | Spertus | |
| 8,187,100 B1 | 5/2012 | Kahn | |
| 8,208,900 B2 | 6/2012 | Adler et al. | |
| 8,344,135 B2 | 1/2013 | Hirose | |
| 8,347,386 B2 | 1/2013 | Mahaffey et al. | |
| 8,407,463 B2 | 3/2013 | Ghirardi | |
| 8,495,700 B2 | 7/2013 | Shahbazi | |
| 8,495,731 B1 * | 7/2013 | Mar | G06F 21/74 379/161 |
| 8,503,340 B1 * | 8/2013 | Xu | H04W 84/12 370/310 |
| 8,516,095 B2 | 8/2013 | Eisener | |
| 8,533,844 B2 | 9/2013 | Mahaffey et al. | |
| 8,584,199 B1 | 11/2013 | Chen et al. | |
| 8,588,749 B1 | 11/2013 | Sadhvani | |
| 8,626,867 B2 | 1/2014 | Boudreau | |
| 8,656,016 B1 | 2/2014 | Bender et al. | |
| 8,667,482 B2 | 3/2014 | Bernardi | |
| 8,799,227 B2 | 8/2014 | Ferguson | |
| 8,799,644 B2 | 8/2014 | Kaleedhass | |
| 8,856,349 B2 | 10/2014 | Jain | |
| 8,869,235 B2 | 10/2014 | Qureshi | |
| 8,909,915 B2 | 12/2014 | Ferren | |
| 8,931,042 B1 | 1/2015 | Weiss | |
| 9,027,151 B2 | 5/2015 | Walsh | |
| 9,075,967 B2 | 7/2015 | Marshall | |
| 9,111,105 B2 | 8/2015 | Barton | |
| 9,183,534 B2 | 11/2015 | Gharabally | |
| 9,213,850 B2 | 12/2015 | Barton et al. | |
| 9,256,758 B2 | 2/2016 | Draluk et al. | |
| 9,438,550 B2 | 9/2016 | Fiatal | |
| 9,582,139 B1 | 2/2017 | Tseng | |
| 9,613,219 B2 | 4/2017 | Ferguson et al. | |
| 9,684,785 B2 | 6/2017 | Walsh | |
| 10,735,964 B2 | 8/2020 | Bender et al. | |
| 2001/0047485 A1 | 11/2001 | Brown et al. | |
| 2001/0054157 A1 | 12/2001 | Fukumoto | |
| 2001/0056549 A1 | 12/2001 | Pinault et al. | |
| 2002/0013815 A1 | 1/2002 | Obradovich et al. | |
| 2002/0019944 A1 | 2/2002 | Kou | |

(56) References Cited

U.S. PATENT DOCUMENTS

| | | |
|---|---|---|
| 2002/0029280 A1 | 3/2002 | Holden et al. |
| 2002/0031230 A1 | 3/2002 | Yu et al. |
| 2002/0035607 A1 | 3/2002 | Checkoway |
| 2002/0065946 A1 | 5/2002 | Narayan |
| 2002/0087880 A1 | 7/2002 | Rhoades |
| 2002/0095414 A1 | 7/2002 | Barnett et al. |
| 2002/0095497 A1 | 7/2002 | Satagopan et al. |
| 2002/0095571 A1 | 7/2002 | Bradee |
| 2002/0112155 A1 | 8/2002 | Martherus et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0026220 A1 | 2/2003 | Uhlik et al. |
| 2003/0031184 A1 | 2/2003 | Cunetto et al. |
| 2003/0035397 A1 | 2/2003 | Haller et al. |
| 2003/0054860 A1 | 3/2003 | Chen |
| 2003/0061087 A1 | 3/2003 | Srimuang |
| 2003/0065676 A1 | 4/2003 | Gbadegesin et al. |
| 2003/0070091 A1 | 4/2003 | Loveland |
| 2003/0084144 A1 | 5/2003 | Lipinski |
| 2003/0087629 A1 | 5/2003 | Juitt et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2003/0200459 A1 | 10/2003 | Seeman |
| 2003/0212895 A1 | 11/2003 | Kisliakov |
| 2003/0226015 A1 | 12/2003 | Neufled et al. |
| 2003/0233410 A1 | 12/2003 | Gusler |
| 2003/0236983 A1 | 12/2003 | Mihm, Jr. et al. |
| 2004/0001101 A1 | 1/2004 | Trajkovic et al. |
| 2004/0083315 A1 | 4/2004 | Grassian |
| 2004/0083382 A1 | 4/2004 | Markham et al. |
| 2004/0097217 A1 | 5/2004 | McClain |
| 2004/0100983 A1 | 5/2004 | Suzuki |
| 2004/0121802 A1 | 6/2004 | Kim et al. |
| 2004/0177073 A1 | 9/2004 | Snyder et al. |
| 2004/0205342 A1 | 10/2004 | Roegner |
| 2004/0209608 A1 | 10/2004 | Kouznetsov et al. |
| 2004/0215702 A1 | 10/2004 | Hamasaki et al. |
| 2004/0260710 A1 | 12/2004 | Marston |
| 2004/0268151 A1 | 12/2004 | Matsuda et al. |
| 2005/0022023 A1 | 1/2005 | Chincheck et al. |
| 2005/0039040 A1* | 2/2005 | Ransom ............... G01R 22/066 726/6 |
| 2005/0149726 A1 | 7/2005 | Joshi |
| 2005/0154935 A1 | 7/2005 | Jin |
| 2005/0164687 A1 | 7/2005 | DiFazio |
| 2005/0172040 A1 | 8/2005 | Hashimoto |
| 2005/0182966 A1 | 8/2005 | Pham et al. |
| 2005/0192008 A1 | 9/2005 | Desai et al. |
| 2005/0210270 A1 | 9/2005 | Rohatgi et al. |
| 2005/0213763 A1* | 9/2005 | Owen ............... H04L 63/0428 380/270 |
| 2005/0245272 A1 | 11/2005 | Spaur et al. |
| 2005/0246716 A1 | 11/2005 | Smith et al. |
| 2005/0249209 A1 | 11/2005 | Fotta |
| 2006/0015621 A1 | 1/2006 | Quinn |
| 2006/0059556 A1 | 3/2006 | Royer |
| 2006/0070114 A1 | 3/2006 | Wood et al. |
| 2006/0090136 A1 | 4/2006 | Miller et al. |
| 2006/0094400 A1 | 5/2006 | Beachem |
| 2006/0114832 A1 | 6/2006 | Hamilton et al. |
| 2006/0120526 A1 | 6/2006 | Boucher et al. |
| 2006/0123485 A1 | 6/2006 | Williams |
| 2006/0129848 A1 | 6/2006 | Paksoy et al. |
| 2006/0129948 A1 | 6/2006 | Hamzy et al. |
| 2006/0136570 A1 | 6/2006 | Pandya |
| 2006/0149846 A1 | 7/2006 | Schuba |
| 2006/0156026 A1 | 7/2006 | Utin |
| 2006/0168259 A1 | 7/2006 | Spilotro et al. |
| 2006/0168395 A1 | 7/2006 | Deng et al. |
| 2006/0206931 A1 | 9/2006 | Dillaway et al. |
| 2006/0212589 A1 | 9/2006 | Hayer et al. |
| 2006/0242685 A1 | 10/2006 | Heard et al. |
| 2006/0274750 A1 | 12/2006 | Babbar et al. |
| 2007/0019643 A1 | 1/2007 | Sahheen |
| 2007/0050854 A1 | 3/2007 | Cooperstein et al. |
| 2007/0073694 A1 | 3/2007 | Picault et al. |
| 2007/0121540 A1 | 5/2007 | Sharp et al. |
| 2007/0143851 A1 | 6/2007 | Nicodemus |
| 2007/0150730 A1 | 6/2007 | Conti |
| 2007/0156766 A1 | 7/2007 | Hoang et al. |
| 2007/0162749 A1 | 7/2007 | Lim |
| 2007/0204153 A1 | 8/2007 | Tome et al. |
| 2007/0204166 A1 | 8/2007 | Tome et al. |
| 2007/0234359 A1 | 10/2007 | Bernabeu et al. |
| 2007/0254631 A1 | 11/2007 | Spooner |
| 2007/0277127 A1 | 11/2007 | Carlson et al. |
| 2007/0294253 A1 | 12/2007 | Strub et al. |
| 2008/0002726 A1 | 1/2008 | Haung et al. |
| 2008/0028442 A1 | 1/2008 | Kaza et al. |
| 2008/0031235 A1 | 2/2008 | Harris et al. |
| 2008/0034418 A1 | 2/2008 | Venkatraman et al. |
| 2008/0034419 A1 | 2/2008 | Mullick et al. |
| 2008/0056151 A1 | 3/2008 | Gazier et al. |
| 2008/0081609 A1 | 4/2008 | Burgan et al. |
| 2008/0098237 A1 | 4/2008 | Dung et al. |
| 2008/0109876 A1 | 5/2008 | Hitomi et al. |
| 2008/0109908 A1 | 5/2008 | Havens et al. |
| 2008/0125146 A1 | 5/2008 | Bainbridge |
| 2008/0130524 A1 | 6/2008 | Volach et al. |
| 2008/0132202 A1 | 6/2008 | Kirkup et al. |
| 2008/0134347 A1 | 6/2008 | Goyal et al. |
| 2008/0137593 A1 | 6/2008 | Laudermilch et al. |
| 2008/0141136 A1 | 6/2008 | Ozzie |
| 2008/0148230 A1 | 6/2008 | Kemmler |
| 2008/0184336 A1 | 7/2008 | Sarukki et al. |
| 2008/0194336 A1 | 8/2008 | Gagner et al. |
| 2008/0222694 A1 | 9/2008 | Nakae |
| 2008/0222711 A1 | 9/2008 | Michaelis |
| 2008/0235041 A1 | 9/2008 | Cashdollar et al. |
| 2008/0244074 A1 | 10/2008 | Baccas |
| 2008/0263014 A1 | 10/2008 | Mazario |
| 2008/0305832 A1 | 12/2008 | Greenberg |
| 2008/0310633 A1 | 12/2008 | Brown et al. |
| 2008/0313648 A1 | 12/2008 | Wang |
| 2008/0318616 A1* | 12/2008 | Chipalkatti ........... H04W 12/08 455/550.1 |
| 2009/0031393 A1 | 1/2009 | Denner |
| 2009/0037594 A1 | 2/2009 | Sever |
| 2009/0068996 A1 | 3/2009 | Bakker et al. |
| 2009/0070181 A1 | 3/2009 | Loeffen |
| 2009/0083643 A1 | 3/2009 | Beringer |
| 2009/0094668 A1 | 4/2009 | Corbin et al. |
| 2009/0178107 A1 | 7/2009 | Karjoth et al. |
| 2009/0181662 A1 | 7/2009 | Fleischman et al. |
| 2009/0227226 A1 | 9/2009 | Gupta |
| 2009/0254753 A1 | 10/2009 | De Atley et al. |
| 2009/0260052 A1 | 10/2009 | Bathula et al. |
| 2009/0300707 A1 | 12/2009 | Garimella et al. |
| 2010/0024016 A1 | 1/2010 | Violleau et al. |
| 2010/0024020 A1 | 1/2010 | Baugher et al. |
| 2010/0081417 A1 | 4/2010 | Hickie |
| 2010/0088753 A1 | 4/2010 | Ayres et al. |
| 2010/0100825 A1 | 4/2010 | Sharoni |
| 2010/0107215 A1 | 4/2010 | Bechtel et al. |
| 2010/0119047 A1 | 5/2010 | Pike et al. |
| 2010/0153969 A1 | 6/2010 | Dyba et al. |
| 2010/0175104 A1 | 7/2010 | Khalid |
| 2010/0184440 A1 | 7/2010 | Mao et al. |
| 2010/0192224 A1 | 7/2010 | Ferri |
| 2010/0222097 A1 | 9/2010 | Gisby et al. |
| 2010/0241579 A1 | 9/2010 | Bassett et al. |
| 2010/0242082 A1 | 9/2010 | Keene |
| 2010/0242086 A1* | 9/2010 | Adams ............... H04L 12/5855 726/1 |
| 2010/0251329 A1 | 9/2010 | Wei |
| 2010/0274910 A1 | 10/2010 | Ghanaie-Sichanie et al. |
| 2010/0278162 A1 | 11/2010 | Groux et al. |
| 2010/0281487 A1 | 11/2010 | Schneider et al. |
| 2010/0299152 A1 | 11/2010 | Batchu |

(56) References Cited

U.S. PATENT DOCUMENTS

| | | |
|---|---|---|
| 2010/0299376 A1 | 11/2010 | Batchu et al. |
| 2010/0299394 A1 | 11/2010 | Jania et al. |
| 2010/0299719 A1 | 11/2010 | Burks et al. |
| 2010/0319053 A1 | 12/2010 | Gharabally |
| 2010/0325221 A1 | 12/2010 | Cohen et al. |
| 2010/0325430 A1 | 12/2010 | Denninghoff |
| 2010/0325710 A1 | 12/2010 | Etchegoyen |
| 2011/0010699 A1 | 1/2011 | Cooper et al. |
| 2011/0030045 A1 | 2/2011 | Beauregard |
| 2011/0053574 A1 | 3/2011 | Rice |
| 2011/0082808 A1 | 4/2011 | Beykpour et al. |
| 2011/0099605 A1* | 4/2011 | Cha .................. H04W 12/06 726/3 |
| 2011/0126214 A1 | 5/2011 | O'Farrell et al. |
| 2011/0131410 A1 | 6/2011 | Tomasso |
| 2011/0145833 A1 | 6/2011 | De Los Reyes et al. |
| 2011/0179083 A1 | 7/2011 | Galloway et al. |
| 2011/0195698 A1 | 8/2011 | Pearce |
| 2011/0210171 A1 | 9/2011 | Brown et al. |
| 2011/0239270 A1 | 9/2011 | Sovio et al. |
| 2011/0246753 A1 | 10/2011 | Thomas |
| 2011/0252234 A1 | 10/2011 | De Atley |
| 2011/0252240 A1 | 10/2011 | Freedman et al. |
| 2011/0270963 A1 | 11/2011 | Saito et al. |
| 2011/0276661 A1 | 11/2011 | Gujarathi et al. |
| 2011/0276961 A1 | 11/2011 | Johansson et al. |
| 2011/0307946 A1 | 12/2011 | Hilerio |
| 2011/0314467 A1 | 12/2011 | Pearson |
| 2012/0005477 A1 | 1/2012 | Wei et al. |
| 2012/0005723 A1 | 1/2012 | Chaturvedi et al. |
| 2012/0005745 A1 | 1/2012 | Wei et al. |
| 2012/0023573 A1 | 1/2012 | Shi |
| 2012/0054853 A1* | 3/2012 | Gupta .................. G06F 21/53 726/17 |
| 2012/0066691 A1 | 3/2012 | Branton |
| 2012/0079110 A1 | 3/2012 | Brown et al. |
| 2012/0079586 A1 | 3/2012 | Brown et al. |
| 2012/0079609 A1 | 3/2012 | Bender et al. |
| 2012/0084184 A1 | 4/2012 | Raleigh et al. |
| 2012/0109826 A1 | 5/2012 | Kobres |
| 2012/0131685 A1 | 5/2012 | Broch et al. |
| 2012/0144196 A1 | 6/2012 | Owen et al. |
| 2012/0151184 A1 | 6/2012 | Wilkerson et al. |
| 2012/0157165 A1 | 6/2012 | Kim et al. |
| 2012/0157166 A1* | 6/2012 | Kim .................. G06F 21/6218 455/566 |
| 2012/0185510 A1 | 7/2012 | Desai |
| 2012/0185661 A1 | 7/2012 | Desai |
| 2012/0185930 A1 | 7/2012 | Desai |
| 2012/0196644 A1 | 8/2012 | Scherzer |
| 2012/0202527 A1 | 8/2012 | Obradovich et al. |
| 2012/0210443 A1 | 8/2012 | Blaisdell et al. |
| 2012/0214442 A1 | 8/2012 | Crawford et al. |
| 2012/0214503 A1 | 8/2012 | Liu et al. |
| 2012/0278863 A1 | 11/2012 | Wallace et al. |
| 2012/0278904 A1 | 11/2012 | Perez et al. |
| 2012/0291140 A1 | 11/2012 | Robert et al. |
| 2012/0304280 A1 | 11/2012 | Hayashida |
| 2012/0309344 A1 | 12/2012 | Ferrazzini et al. |
| 2012/0324067 A1 | 12/2012 | Hari et al. |
| 2013/0016696 A1 | 1/2013 | Adjakple et al. |
| 2013/0074142 A1 | 3/2013 | Brennan et al. |
| 2013/0097316 A1 | 4/2013 | Bender et al. |
| 2013/0097657 A1 | 4/2013 | Cardamore et al. |
| 2013/0097701 A1 | 4/2013 | Moyle et al. |
| 2013/0124583 A1 | 5/2013 | Ferguson et al. |
| 2013/0138954 A1 | 5/2013 | Draluk |
| 2013/0174222 A1 | 7/2013 | Ogle |
| 2013/0219465 A1 | 8/2013 | Tse et al. |
| 2013/0283017 A1 | 10/2013 | Wilkerson et al. |
| 2013/0346606 A1* | 12/2013 | Ryerson .................. H04W 12/08 709/225 |
| 2014/0006347 A1* | 1/2014 | Qureshi .................. G06F 21/10 707/621 |
| 2014/0071895 A1 | 3/2014 | Bane |
| 2014/0108599 A1 | 4/2014 | Borzycki |
| 2014/0330990 A1 | 11/2014 | Lang |
| 2015/0067527 A1 | 3/2015 | Gardner |
| 2015/0312220 A1 | 10/2015 | Crawford |
| 2016/0099963 A1 | 4/2016 | Mahaffey et al. |
| 2017/0048278 A1 | 2/2017 | Tomasso |
| 2017/0054758 A1 | 2/2017 | Maino et al. |
| 2017/0085488 A1 | 3/2017 | Bhattacharya et al. |
| 2017/0085629 A1 | 3/2017 | Mahapatra |
| 2017/0163572 A1 | 6/2017 | Cheng et al. |
| 2017/0171047 A1 | 6/2017 | Freishtat |
| 2017/0195210 A1 | 7/2017 | Jacob et al. |
| 2017/0208098 A1 | 7/2017 | Ferguson et al. |
| 2017/0244592 A1 | 8/2017 | Mahapatra |
| 2017/0331665 A1 | 11/2017 | Porfiri et al. |
| 2017/0366618 A1 | 12/2017 | Vrzic et al. |
| 2018/0184352 A1 | 6/2018 | Lopes et al. |
| 2018/0192471 A1 | 7/2018 | Li et al. |

FOREIGN PATENT DOCUMENTS

| | | |
|---|---|---|
| CN | 1918549 | 2/2007 |
| CN | 101004776 | 7/2007 |
| CN | 101253487 | 8/2008 |
| CN | 101523878 | 9/2009 |
| CN | 101536465 | 9/2009 |
| EP | 332558 | 9/1989 |
| EP | 605106 | 7/1994 |
| EP | 973350 | 1/2000 |
| EP | 1168141 | 1/2002 |
| EP | 1471691 | 10/2004 |
| EP | 1596410 | 11/2005 |
| EP | 1624428 | 2/2006 |
| EP | 1806674 | 7/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000/253241 | 9/2000 |
| JP | 2001/077811 | 3/2001 |
| JP | 2001/203761 | 7/2001 |
| JP | 2002/288087 | 10/2002 |
| WO | 1996/025828 | 8/1996 |
| WO | 1999/005814 | 2/1999 |
| WO | 2000/059225 | 10/2000 |
| WO | 2000/060434 | 10/2000 |
| WO | 2004/017592 | 2/2004 |
| WO | 2004/043031 | 5/2004 |
| WO | 2005/045550 | 5/2005 |
| WO | 2005/062279 | 7/2005 |
| WO | 2005/107144 | 11/2005 |
| WO | 2006/130807 | 12/2006 |
| WO | 2007/048251 | 5/2007 |
| WO | 2009/012329 | 1/2009 |
| WO | 2009/014975 | 1/2009 |
| WO | 2009/021200 | 2/2009 |
| WO | 2012/037656 | 3/2012 |
| WO | 2012/037657 | 3/2012 |
| WO | 2012/037658 | 3/2012 |
| WO | 2012/109497 | 8/2012 |

OTHER PUBLICATIONS

Summons to Attend Oral Proceedings issued in European Application No. 12847536.5 dated Dec. 13, 2016.
Office Action issued in Chinese Application No. 201280066715.6 dated Mar. 9, 2017.
Chen, Zhijun; "Java Card Technology for Smart Cards: Architecture and Programmer's Guide: Applet Firewall and Object Sharing," Internet citation, Jun. 2, 2000, 23 pages; (XP002167366) <http://developer.java.sun.com/developer/Books/consumerproducts/javacard/ch09.pdf>.
"A Technical Overview of the Lucent VPN Firewall" White Paper Lucent Technologies, XX, XX, Aug. 2002, pp. 1-35, XP002271173, Chapter 1.

(56) References Cited

OTHER PUBLICATIONS

"Customizing User Interaction in Smart Phones", Pervasive Computing, IEEE CS (2006) pp. 81-90 (URL: http://www.idi. ntnu.no/grupperlsu/bibliography/pdf/2006/Korpipaa2006pc.pdf).
"Secure Inter-Process Communication"; Apr. 4, 2004. Retrieved from internet on Jan. 20, 2014; 2 pages; <https://web.archive.org/web/20040404015137/http://cr.yp.to/docs/secureipc.html>.
"Supporting Mobile Privacy and Security through Sensor-Based Context Detection," Julian Seifert, Second International Workshop on Security and Privacy in Spontaneous Interaction and Mobile Phone Use, May 17, 2010, Finland; <http://www.medien.ifi.lmu.de/iwssi201 0/papers/iwssi-spmu2010-seifert.pdf).
"Using context-profiling to aid access control decisions in mobile devices", Gupta et aI., Nokia Research Center (URL: <http://www.cerias.purdue.edu/assets/symposium/2011-posters1372-C48.pdf) Please refer to the I-page file named 372-C48.pdf>; 2011.
Basic Access Authentication (Jan. 23, 2010): <http://en.wikipedia.org/wiki/Basic_access_authentication>.
Boyce, "Microsoft Outlook 2010 Inside Out," Microsoft Press, Aug. 15, 2010, chapters cited: 3, 6-7, 14, 18-19, 21, 34-35, 152 pages (XP055196121).
Cross-site request forgery (Nov. 30, 2008): <http://en.wikipedia.org/wiki/Cross-site_request_forgery>.
Digest Access Authentication (Dec. 23, 2009): <http://en.wikipedia.org/wiki/Digest_access_authentication>.
EagleVision: A Pervasive Mobile Device Protection System, Ka Yang, Nalin Subramanian, Daji Qiao, and Wen sheng Zhang, Iowa State University; <http://www.cs.iastate.edu/-wzhang/papers/eagleVision.pdf>; Jul. 13-16, 2009.
Google Inc.; Android 2.3.4 User's Guide; May 20, 2011; 384 pages.
IETF RFC 3530; "Network File System (NFS) Version 4 Protocol"; Apr. 2003; 191 pages.
Introduction to using IRM for e-mail messages; Support/Outlook/Outlook 2007 Help and How-to. <http://office.microsoft.com/en-us/outlook-help/introduction-to-using-irm-for-e-mail-message-HA010100366.aspx?CTT=5&or . . . , pp. 1-6, retrieved on Feb. 12, 2010.
Microsoft Corp.; Microsoft Outlook 2010; Released Jul. 15, 2010; 27 pages.
Microsoft Office: Microsoft Outlook 2010 Product Guide; Microsoft Corp. 2010; published in 2010; 65 pages.
Red Hat: "Red Hat Linux 7.2—The Official Red Had Linux Reference Guide" Red Hat Linux Manuals, Online!, Oct. 22, 2001, XP002276029, pp. 145-155.
Research In Motion, "BlackBerry Bridge App 2.1 and Blackberry PlayBook Tablet 2.1, Security Technical Overview"; Version: 2.1; Jul. 17, 2012; 43 pages.
Research In Motion, "BlackBerry Device Service 6.1 and BlackBerry PlayBook Tablet 2.1, Security Technical Overview"; Version: 6.1; Sep. 17, 2012; 90 pages.
Saurabh, Saha; "Automatically Open Certain Websites in Google Chrome Incognito Private Browsing Mode"; Dec. 31, 2012; 5 pages; <http://web.archive.org/web/20121231021254/http://www.techgyd.com/auto-open-sites-in-google-incognito/360>.
Send an e-mail message with restricted permission by using IRM; Support/Outlook/Outlook 2007 Help and How to; <http://office.mircosoft.com/en-us/outlook-help/send-an-e-mail-message-with-restricted-permission-by-using-irm-HA01024780 . . . >, pp. 1-4, retrieved on Feb. 12, 2010.
Smartphone Security Beyond Lock and Wipe (Jun. 10, 2010): <http://www.enterprisemobiletoday.com/article.php/3887006>.
Sygate: "Sygate Personal Firewall PRO User Guide" Sygate Personal Firewall Pro User Guide version 2.0; 2001, pp. 1-77, XP002248366.
View messages with restricted permission sent by using IRM; Support/Outlook/Outlook 2007 Help and How-to; <http://office.mircosoft.com/en-us/outlook-help/view-messages-with-restricted-permission-sent-by-using-irm-HA010246115.as . . . >, pp. 1-2, retrieved on Feb. 12, 2010.
Windows 7 Product Guide; Microsoft Corp. 2009; published in 2009; 140 pages.
"File System Permissions," Wikipedia, the free encyclopedia, Nov. 1, 2011, XP055256892, <https://en.wikipedia.org/w/index.php?title=File_system_permissions&oldid=458457904>.
European Search Report in European Application No. 04256690.1, dated Apr. 6, 2005; 9 pages.
European Supplementary Search Report in European Application No. 05738877.9 dated Sep. 13, 2007; 3 pages.
Extended European Search Report in European Application No. 11162178.5, dated Mar. 17, 2014; 7 pages.
Extended European Search Report in European Application No. 11186796.6 dated Jan. 18, 2012; 8 pages.
Extended European Search Report in European Application No. 11186802.2 dated Jan. 18, 2012; 7 pages.
Extended European Search Report in European Application No. 11188696.6, dated Apr. 12, 2012; 7 pages.
Extended European Search Report in European Application No. 12153439.0, dated Jul. 13, 2012; 7 pages.
Extended European Search Report in European Application No. 12155659.1, dated Aug. 1, 2012; 7 pages.
Extended European Search Report in European Application No. 12173030.3 dated Nov. 22, 2012; 6 pages.
Extended European Search Report in European Application No. 12189773.0 dated Mar. 7, 2013; 8 pages.
Extended European Search Report in European Application No. 12189805.0 dated Apr. 16; 2013; 6 pages.
Extended European Search Report in European Application No. 12847536.5, dated Jun. 29, 2015; 8 pages.
Extended European Search Report issued in European Application No. 13165229.9 dated Nov. 10, 2015; 7 pages.
Communication Pursuant to Article 94(3) EPC issued in European Application No. 11186802.2 dated Mar. 14, 2016; 6 pages.
Communication Pursuant to Article 94(3) EPC issued in European Application No. 12847536.5 dated Mar. 16, 2016; 10 pages.
Communication Pursuant to Article 94(3) EPC issued in European Application No. 12173030.3 dated Sep. 8, 2016; 4 pages.
International Search Report and Written Opinion of the International Searching Authority issued in International Application No. PCT/CA2012/050796 dated Feb. 21, 2013; 13 pages.
International Preliminary Report on Patentability under Ch. II issued in International Application No. PCT/CA2012/050796 dated Mar. 10, 2014; 18 pages.
International Search Report and Written Opinion issued in International Application No. PCT/CA2011/001058 dated Dec. 21, 2011; 9 pages.
International Search Report and Written Opinion issued in International Application No. PCT/CA2012/050797 dated Feb. 5, 2013; 8 pages.
International Preliminary Report on Patentability under Chapter II issued in International Application No. PCT/CA2012/050797 dated Feb. 12, 2014; 13 pages.
International Search Report and Written Opinion of the International Searching Authority issued in International Application No. PCT/CA2011/050707 dated Jan. 18, 2012; 7 pages.
International Search Report issued in International Application No. PCT/CA2005/000652 dated Aug. 17, 2005; 9 pages.
International Search Report issued in International Application No. PCT/CA03/01245, dated Dec. 23, 2003; 3 pages.
Written Opinion issued in International Application No. PCT/CA03/01245, dated Apr. 23, 2004; 2 pages.
Written Opinion issued in International Application No. PCT/CA03/01245, dated Sep. 20, 2004; 6 pages.
International Preliminary Examination Report issued in International Application No. PCT/CA03/01245, dated Nov. 29, 2004; 8 pages.
International Search Report and the Written Opinion of the International Searching Authority issued in International Application No. PCT/CA2004/000250 dated Sep. 14, 2004; 12 pages.
International Search Report issued in International Application No. PCT/CA03/01679 dated May 6, 2004; 6 pages.
Office Action issued in Canadian Application No. 2,792,772 dated Sep. 5, 2014; 3 pages.

(56) References Cited

OTHER PUBLICATIONS

Office Action issued in Canadian Application No. 2,792,707 dated Sep. 8, 2014; 3 pages.
Office Action issued in Canadian Application No. 2,820,687 dated Nov. 3, 2014; 3 pages.
Office Action issued in Canadian Application No. 2,792,772 dated Jul. 29, 2015; 4 pages.
Office Action issued in Canadian application No. 2,792,707 dated Jul. 30, 2015; 3 pages.
Office Action issued in Canadian Application No. 2,820,687 dated Oct. 13, 2015; 4 pages.
Office Action issued in Canadian Application No. 2792707 dated Sep. 28, 2016; 3 pages.
Office Action issued in Chinese Application No. 201280066715.6 dated Mar. 4, 2016; 26 pages.
Office Action issued in Chinese Application No. 201180065344.5 dated Jun. 3, 2016; 7 pages.
Office Action issued in Chinese Application No. 201310504548.5 dated Sep. 5, 2016; 15 pages.
Office Action issued in Chinese Application No. 201280066860.4 dated Sep. 18, 2016; 17 pages.
Office Action issued in Chinese Application No. 201310503089.9 dated Sep. 28, 2016; 22 pages.
Office Action issued in Chinese Application No. 201280066715.6 dated Nov. 10, 2016; 14 pages.
Office Action issued in U.S. Appl. No. 13/801,437 dated Nov. 28, 2017; 48 pages.
Summons to Attend Oral Proceedings issued in European Application No. 11186802.2 dated Nov. 23, 2017; 7 pages.
Decision to Refuse a European Patent Application issued in European Application No. 11188696.6 dated Dec. 14, 2017; 15 pages.
Office Action issued in U.S. Appl. No. 15/218,776 dated Sep. 22, 2017; 33 pages.
Office Action issued in U.S. Appl. No. 13/296,963 dated Oct. 5, 2017; 28 pages.
"File System Permissions," (XP055256892) Wikipedia, the free encyclopedia, Nov. 1, 2011; 6 pages, <https://en.wikipedia.org/w/index.php?title=File_system_permissions&oldid=458457904>.
Office Action issued in U.S. Appl. No. 13/296,963 dated Jul. 7, 2017; 44 pages.
Extended European Search Report issued in European Application No. 11841258.4 dated Apr. 6, 2017; 6 pages.
Summons to Attend Oral Proceedings issued in European Application No. 11188696.6 dated Apr. 25, 2017; 4 pages.
Decision to Refuse a European Patent Application issued in European Application No. 12847536.5 dated Jul. 11, 2017; pp. 16.
Office Action issued in Chinese Application No. 201310504548.5 dated Mar. 22, 2017; 19 pages.
Office Action issued in Chinese Application No. 201280066860.4 dated May 17, 2017; 7 pages.
Office Action issued in Chinese Application No. 201310503089.9 dated Jun. 13, 2017; 8 pages.
Office Action issued in Chinese Application No. 201280066715.6 dated Sep. 6, 2017; 15 pages.
Office Action issued in Canadian Application No. 2,854,540 dated Aug. 13, 2018; 7 pages.
Office Action issued in Chinese Application No. 201280066715.6 dated Jul. 2, 2018, 22 pages.
Summons to attend oral proceedings pursuant to Rule 115(1) EPC issued in European Application No. 12173030.3 dated Aug. 20, 2018, 8 pages.
Advisory Action issued in U.S. Appl. No. 15/177,759 dated Aug. 14, 2018, 3 pages.
Notice of Allowance issued in U.S. Appl. No. 15/218,776 dated Jun. 21, 2018, 8 pages
Reexamination Report issued in Chinese Application No. 201280066715.6 dated Aug. 31, 2018, 13 pages.
Office Action issued in U.S. Appl. No. 13/296,963 dated Jul. 5, 2018, 24 pages.
Office Action issued in U.S. Appl. No. 13/801,437 dated Aug. 3, 2018, 23 pages.
Office Action (Final) issued in U.S. Appl. No. 15/478,824 dated Jul. 20, 2018, 18 pages.
Office Action Issued in U.S. Appl. No. 15/478,824 dated Feb. 7, 2018, 15 pages.
Office Action issued in U.S. Appl. No. 15/177,759 dated May 25, 2018, 21 pages.
Communication Pursuant to Article 94(3) EPC issued in European Application No. 13165229.9 dated Mar. 21, 2018, 6 pages.
Communication Pursuant to Article 94(3) EPC issued in European Application No. 11841258.4 dated Mar. 21, 2018, 4 pages.
Decision to Refuse European Application issued in European Application No. 11186802.2 dated May 16, 2018, 27 pages.
Brief Communication of Oral Proceedings issued in European Application No. 12173030.3 dated Oct. 29, 2018, 5 pages.
Notice of Allowance issued in U.S. Appl. No. 15/218,776 dated May 30, 2019, 14 pages.
Notice of Allowance issued in U.S. Appl. No. 15/177,759 dated Jun. 3, 2019, 66 pages.
Advisory Action issued in U.S. Appl. No. 13/801,437 dated May 7, 2019, 2 pages.
Decision to Refuse a European Patent Application No. 13165229.9 dated Apr. 29, 2019, 17 pages.
Provision of the Minutes of Oral Proceedings in Accordance with Rule 124(4) EPC issued in European Application No. 13165229.9 dated Apr. 25, 2019, 6 pages.
Non-Final Office Action issued in U.S. Appl. No. 15/177,759 dated Sep. 27, 2018, 22 pages.
Interview Summary issued in U.S. Appl. No. 15/478,824 dated Oct. 5, 2018, 2 pages.
Advisory Action issued in U.S. Appl. No. 15/478,824 dated Oct. 12, 2018, 7 pages.
Notice of Allowance issued in U.S. Appl. No. 15/478,824 dated Nov. 27, 2018, 9 pages.
Final Office Action issued in U.S. Appl. No. 13/296,963 dated Dec. 14, 2018, 17 pages.
Decision to refuse a European Patent Application issued in European Application No. 12173030.3 dated Dec. 3, 2018, 12 pages.
Result of Consultation issued in European Application No. 13165229.9 dated Dec. 10, 2018, 10 pages.
Reexamination Decision issued in Chinese Application No. 201280066715.6 dated Nov. 27, 2018, 22 pages.
Brazilian Office Action issued in Brazilian Application No. PI0510378-9 dated May 7, 2018, 11 pages.
Advisory Action issued in U.S. Appl. No. 13/296,963 dated Mar. 29, 2019, 3 pages.
Examination Search Report issued in Canadian Application No. 2,854,540 dated Apr. 3, 2019, 15 pages.
Notice of Allowance issued in U.S. Appl. No. 15/218,776 dated Jan. 10, 2019, 8 pages.
Non-Final Office Action issued in U.S. Appl. No. 15/478,824 dated Jan. 31, 2019, 10 pages.
Notice of Allowance issued in U.S. Appl. No. 15/218,776 dated Feb. 21, 2019, 14 pages.
Final Office Action issued in U.S. Appl. No. 13/801,437 dated Feb. 25, 2019, 59 pages.
Supplementary Search issued in Chinese Application No. 2012800667156 dated Feb. 14, 2019, 1 page.
Office Action issued in Chinese Application No. 201280066715.6 dated Feb. 27, 2019, 8 pages.
Final Office Action issued in U.S. Appl. No. 15/478,824, dated Jul. 15, 2019, 41 pages.
Notice of allowance issued in U.S. Appl. No. 15/218,776 dated Nov. 4, 2019, 11 pages.
Non-Final Office Action issued in U.S. Appl. No. 15/177,759 dated Sep. 10, 2019, 22 pages.
Non-final office action issued in U.S. Appl. No. 13/296,963 dated Oct. 3, 2019, 48 pages.
Office Action issued in European Application No. 11841258.4 dated Aug. 7, 2019, 5 pages.
Non-Final office action issued in U.S. Appl. No. 15/478,824 dated Nov. 7, 2019, 16 pages.

(56) References Cited

OTHER PUBLICATIONS

Advisory Action issued in U.S. Appl. No. 15/478,824 dated Oct. 4, 2019, 3 pages.
Corrected Notice of Allowability issued in U.S. Appl. No. 15/218,776 dated Oct. 16, 2019, 5 pages.
Notice of allowance issued in U.S. Appl. No. 15/218,776 dated Dec. 18, 2019, 11 pages.
Advisory Action issued in U.S. Appl. No. 15/177,759 dated Apr. 3, 2020, 3 pages.
Final office action issued in U.S. Appl. No. 15/177,759 dated Jan. 21, 2020, 25 pages.
Final Office Action issued in U.S. Appl. No. 13/296,963 dated Feb. 6, 2020, 36 pages.
Office Action issued in European Application No. 11841258.4 dated Jan. 7, 2020, 5 pages.
Notice of Allowance issued in U.S. Appl. No. 15/478,824 dated Apr. 15, 2020, 21 pages.
Office Action issued in Canadian Application No. 2,854,540 dated May 12, 2020, 1 page.
Office Action issued in Canadian Application No. 2,854,540 dated Jun. 3, 2020, 1 page.
Office Action issued in Canadian Application No. 2,861,676 dated Jun. 5, 2020, 3 pages.
Advisory Action issued in U.S. Appl. No. 13/296,963 dated May 15, 2020, 4 pages.
Corrected notice of allowability issued in U.S. Appl. No. 15/218,776 dated Jun. 16, 2020, 3 pages.
Office Action issued in Canadian Application No. 2,829,805 dated Jun. 5, 2020, 5 pages.
Notice of Allowance issued in U.S. Appl. No. 15/478,824 dated Aug. 31, 2020, 12 pages.
Wack et al., "Guidelines on Firewalls and Firewall Policy: Recommendations of the National Institute of Standards and Technology," NIST Special Publication 800-41, Jan. 2002, 81 pages.
Final Office Action issued in U.S. Appl. No. 15/177,759 dated Jan. 28, 2021, 20 pages.

* cited by examiner

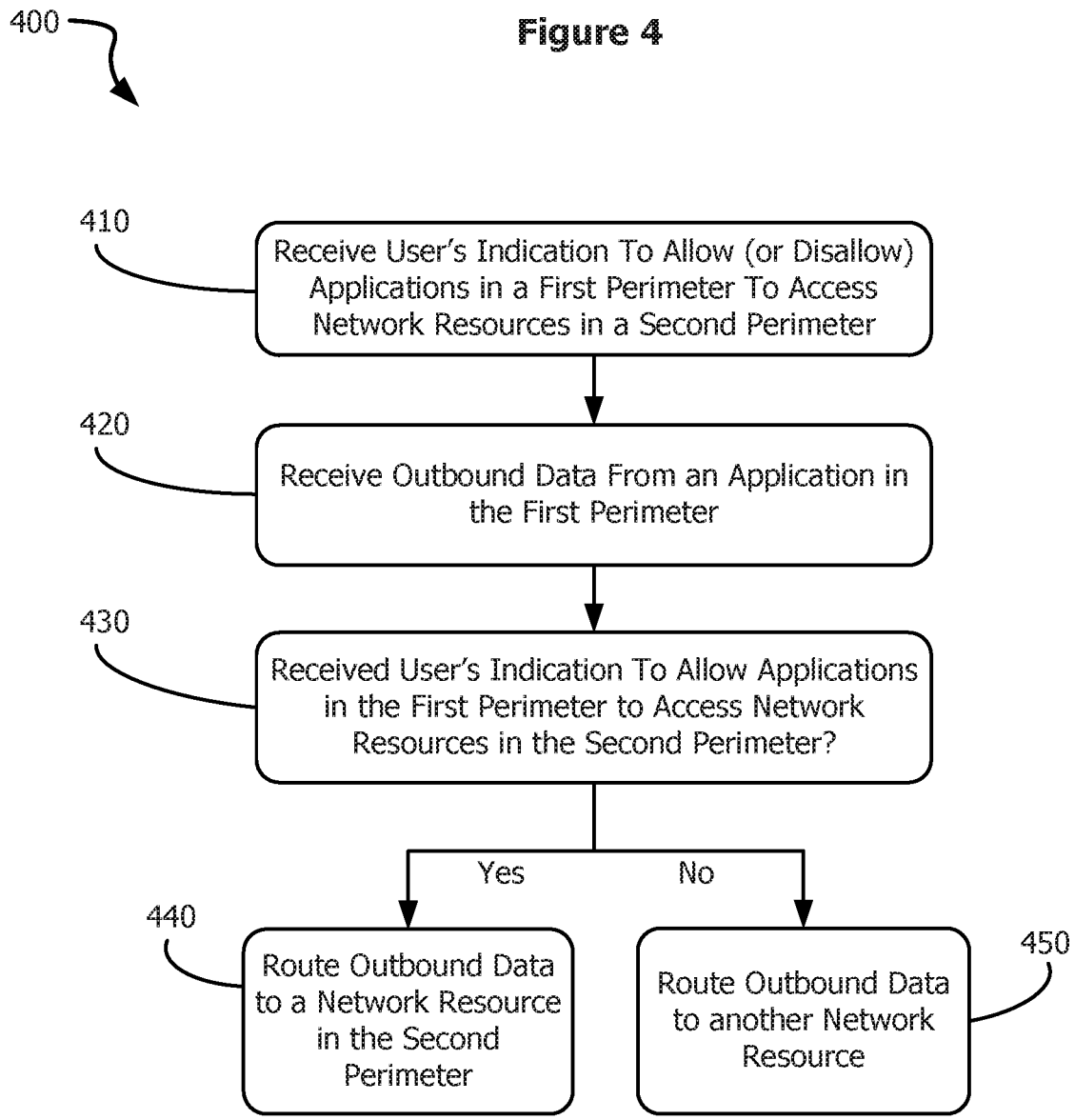

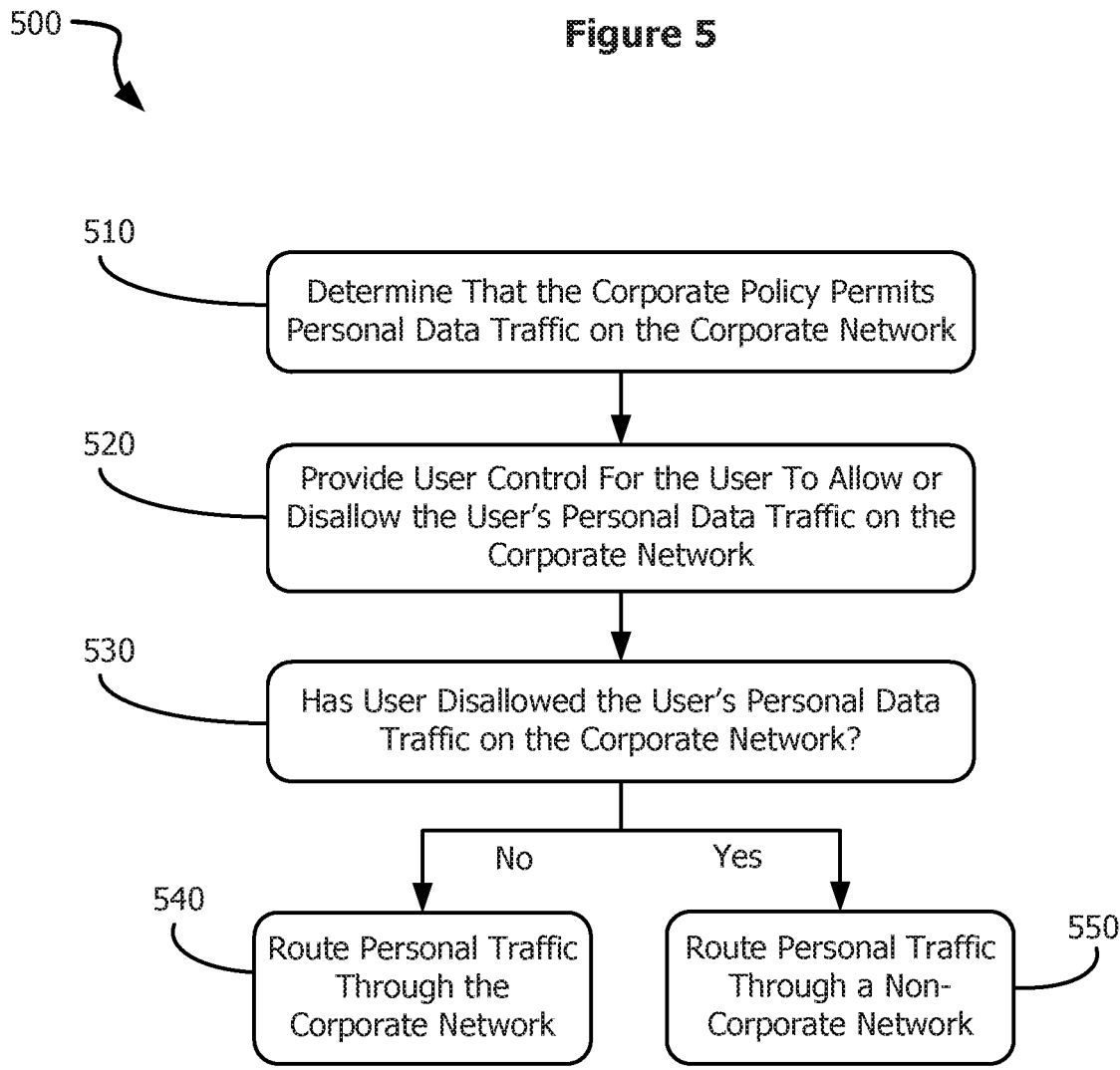

MANAGING USE OF NETWORK RESOURCES

BACKGROUND

This disclosure relates to managing use of network resources on a device. Many communication devices include data, applications, and network resources whose accessibility is controlled by security protocols. For example, user accounts, administration rights, password protection, database management, and others may be managed by or otherwise associated with different entities (e.g., an enterprise, a user).

DESCRIPTION OF DRAWINGS

FIG. 4 is a flow chart showing an example technique for managing use of network resources on a mobile device.

FIG. 5 is a flow chart showing an example technique for managing use of corporate network resources on a mobile device.

Like reference symbols in the various drawings indicate like elements.

DETAILED DESCRIPTION

Figure 1:
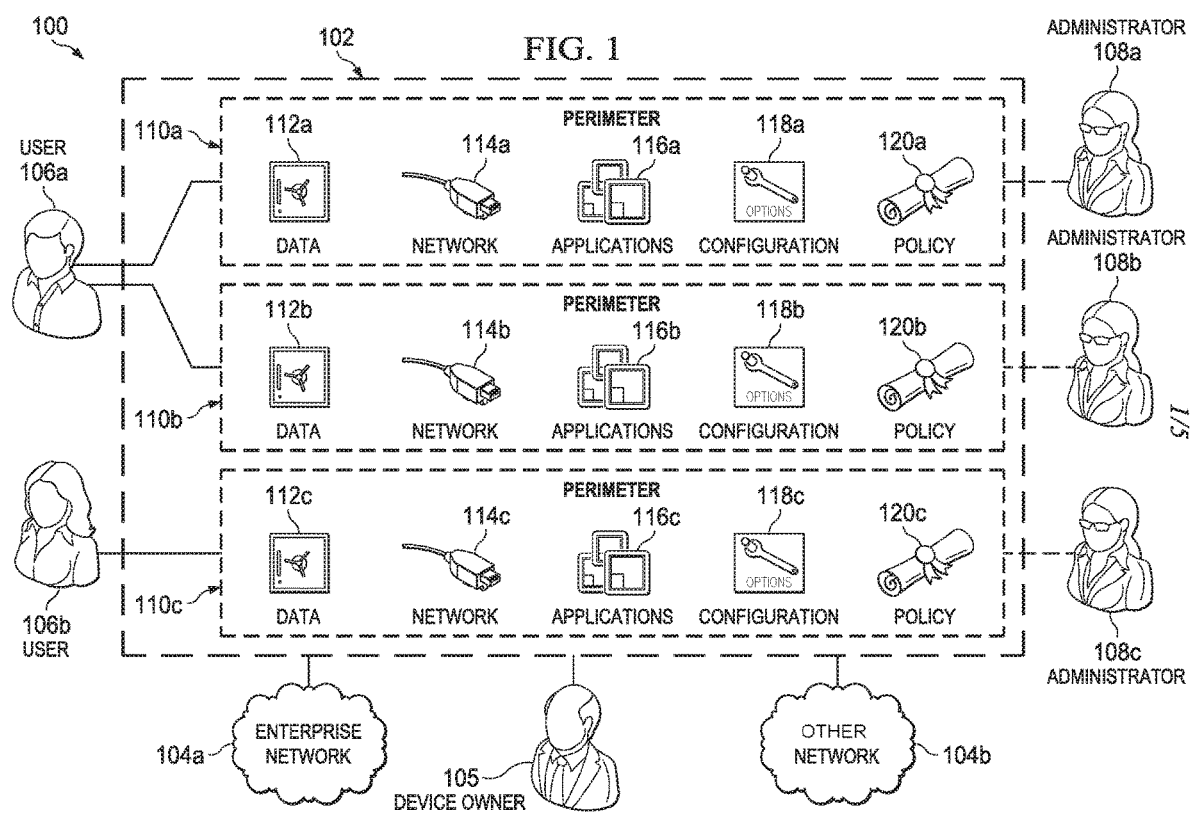
FIG. 1 is a schematic diagram showing an example data communication system.

Perimeters can be used to logically separate information (e.g., data, applications, network resources, etc.) on a user device. In some instances, particular resources are shared among multiple perimeters. For example, a network resource in a first perimeter may be accessible to applications in other perimeters. The user device may include policies for cross-perimeter access that specify rules for individual perimeters, applications, network resources, or any suitable combination.

An administrator of a perimeter may determine which resources of the perimeter can be accessed by other perimeters. For example, a personal perimeter can be managed by the device user, and an enterprise perimeter can be managed by a corporate administrator. The user's personal applications in the personal perimeter can use network resources in the personal perimeter. The user can also choose whether the personal applications can use an enterprise network. For example, due to privacy concerns, a user may not want his or her web browsing information to traverse a corporate network.

In some instances, an enterprise administrator can set rules on what perimeters (at a macro level) or what applications (at a micro level) can use the enterprise networks. For example, due to security concerns, an enterprise administrator may not want a user-installed application (malware or otherwise) to be able to access on-enterprise network resources. But the administrator may trust certain applications (e.g., applications provided by a particular software provider, or applications having certain security features) and allow those applications to access the enterprise network.

A single device may be configured to allow concurrent use for both personal and work purposes, while keeping personal and work traffic separate. Such use can be provided in a convenient manner that requires no user intervention after the initial setup. In some implementations, users can access the Internet through non-corporate networks for personal use without being subject to restrictions imposed by their employer, and without having their traffic subject to being monitored or scrutinized by their employer. Users may also access the Internet or other network resources through corporate networks for work purposes. The device may be configured to ensure enterprise control over the work traffic, and the user can be given control over whether personal traffic is allowed to flow on corporate networks.

A user control can permit the user to either allow or disallow the user's personal traffic on the corporate network. In cases where an employer has decided to allow personal traffic to flow on corporate networks, the user may wish to avoid those networks so that their personal traffic is not subject to employer restrictions or employer inspection. For example, an employer may restrict access to particular websites, or employees may fear that their employer will scrutinize the websites they visit. As such, personal traffic can be segregated from work traffic on the device, and the user can choose whether personal traffic can be sent over the corporate network. In some cases, personal traffic is sent over a personal network while corporate traffic is sent over a corporate network. This solution can provide added convenience and privacy for the user, and greater flexibility on devices that are used for both business and personal purposes.

In an example scenario, a device is connected to a corporate Wi-Fi network. The user may save airtime costs by routing all of their data over the corporate Wi-Fi network (e.g., instead of using a personal data plan). But the user may also be subject to restrictive policies on the corporate Wi-Fi network (e.g., access to certain sites may be restricted). As such, the user may want to route personal data through non-corporate network resources (e.g., a personal mobile data plan), while routing corporate data through corporate network resources. In the example scenario, the user has the ability to decide whether to route personal data traffic over the corporate Wi-Fi network or to use another network for personal data traffic without disabling the corporate Wi-Fi connection. Allowing the user to indicate whether to route personal data over the corporate network may provide greater flexibility.

Accordingly, using the corporate network for personal applications may have certain advantages (e.g., save money, faster network, etc.) while using a personal mobile plan may have other advantages (e.g., greater privacy, unrestricted access to the Internet, etc.). These considerations may be communicated to the user in association with the user's selection. For example, informative messages can be provided before or after the user makes a selection, or the information may be provided concurrently with the control interface.

FIG. 1 is a schematic diagram showing an example data communication system 100. The example data communication system 100 includes a device 102, an enterprise network 104a, and other networks 104b. A data communication system may include additional, different, or fewer features, as appropriate. The diagram in FIG. 1 also shows interactions by users 106a, 106b, by a device owner 105, and by administrators 108a, 108b, 108c. In some cases, the device owner 105 can be one of the users 106a or 106b, a business enterprise, or another entity. Additional, different, or fewer entities may interact with a data communication system, as appropriate in various implementations.

The device 102 can be any suitable computing device. Generally, a computing device includes a computer-readable medium and data processing apparatus. The computer-readable medium may include any suitable memory, disc, storage device, or other apparatus configured to store machine-readable information. The computer-readable medium can store instructions that are executable by the data processing apparatus. The data processing apparatus can include any suitable processor, controller, circuitry, or other apparatus configured to perform operations based on machine-readable instructions. The data processing apparatus can include a programmable processor, digital logic circuitry, firmware, or any other suitable device. The computer-readable medium can include a single medium or multiple media, and the data processing apparatus can include a single apparatus or multiple apparatus.

The example device 102 is operable to receive requests from the user via a user interface, such as a graphical user interface or any other suitable user interfaces. As shown in FIG. 1, the device 102 is communicably coupled to the enterprise network 104a and to one or more other networks 104b. The example device 102 is operable to receive, transmit, process and store any appropriate data. For example, the device 102 can be a smartphone, a tablet computer, a personal computer, a laptop computer, a personal data assistant (PDA), or another type of user device. The device 102 may include an input device, such as a keypad, touch screen, mouse, or other device that can accept information, and an output device (e.g., display screen) that conveys information associated with the operation of the resources. Both the input device and output device may include fixed or removable storage media (e.g., memory, etc.) to both receive input from and provide output to users through the display.

As shown in FIG. 1, the device 102 includes three example perimeters 110a, 110b, and 110c (individually and collectively referred to as "perimeters 110"). Each perimeter 110 includes data 112, network access resources 114, one or more applications 116, configuration files 118, and one or more policies 120. A perimeter 110 may include only a subset of the illustrated resources, or a perimeter 110 may include additional or different resources.

The example perimeters 110 can logically separate resources (e.g., applications, data, network access resources, configuration files, etc.) such that resources in a given perimeter can, in some instances, be prevented from accessing resources included in a different perimeter. For example, the perimeters may prevent personal resources in one perimeter from accessing corporate resources in another perimeter, or vice-versa. In some cases, an enterprise may extend a secured perimeter on a single user device without interfering with the user's personal experience on the same device. The perimeters may also permit cross-perimeter access to resources. Access to perimeter resources may be controlled by defining, assigning or otherwise associating a policy to each perimeter.

A policy for a perimeter can be implemented in any suitable format, using any appropriate information. A policy can specify access to both the external resources (in another perimeter) that can be accessed by internal applications (running in the perimeter) and internal resources that can be accessed by external applications. For example, a given perimeter's policy may identify other perimeters that are accessible, internal resources that are not accessible to other perimeters, or both. A perimeter's policy may identify specific users that can or cannot access specified resources in the perimeter. In some implementations, the policies from both perimeters determine whether cross-perimeter access is granted, or, if there is a conflict, the strictest policy can be applied.

A perimeter may refer to a logical separation of computing resources such that transferring data between perimeters and accessing resources of other perimeter can be controlled. Resources may include applications, file systems, network access, or other computer resources. In addition to enabling access to resources within a perimeter, the example data communication system 100 may include a policy that identifies specific external resources that a resource in a perimeter may access. The example data communication system 100 may manage a seamless user experience in which the perimeter concept is executed.

A perimeter 110 may include password protection, encryption, and other process for controlling access to resources assigned to the perimeter. A perimeter 110 may be generated by the device owner, a user, an administrator, or others. In some examples, the perimeter 110a may be a personal perimeter created for the user 106a and managed by the user 106a. In some examples, the perimeter 110b may be an enterprise perimeter created by an administrator 108b for an enterprise and may be managed by a remote management server. In addition, a given perimeter may be accessed by the device owner 105, a user, an administrator, any suitable combination. In some implementations, each perimeter may be associated with a single user, and at least some users may access multiple device perimeters. For example, the first user 106a may access resources within both the perimeter 110a and the perimeter 110b, and the second user 106b may have access to only one perimeter 110c.

In some instances individual perimeters may be added, deleted, or modified. The device owner 105 may have the ability to add or remove individual perimeters 110 from the device 102. In some implementations, a user can create a perimeter. In some instances, an organization associated with the enterprise network 104a can send the device information identifying the initial resources (e.g., applications, policies, configurations, etc.) for a new perimeter. A perimeter administrator may assign policies for the perimeters and initiate perimeter updates. In some implementations, perimeter administrators can remotely lock and/or wipe a perimeter.

Information may be stored on the device 102 in any suitable memory or database module. Example memories include volatile and non-volatile memory, magnetic media, optical media, random access memory (RAM), read-only memory (ROM), removable media and others. The data 112 can include any suitable information. The device 102 can store various objects, including files, classes, frameworks, backup data, business objects, jobs, web pages, web page templates, database tables, repositories storing business and/or dynamic information, and any other appropriate information including any parameters, variables, algorithms, instructions, rules, constraints, or references thereto. The data 112 may include information that is associated with an application, a network, a user, and other information.

The network access resources 114 can include any suitable parameters, variables, policies, algorithms, instructions, settings, or rules for granting access to networks. For example, the network access resources 114a may include or identify firewall policies for accessing the enterprise network 104a. As another example, the network access resources 114b may include or identify account data for accessing one or more of the other networks 104b. In some implementations, network access resources include or otherwise identify one or more of the following: a username; a password; a security token; a Virtual Private Network (VPN)

configuration; firewall policies; a communication protocol; encryption key certificate; or others.

The applications 116 can include any suitable program, module, script, process, or other object that can execute, change, delete, generate, or process information. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the device 102, one or more processes associated with the applications 116 may be stored, referenced, or executed remotely. For example, a portion of the applications 116 may be an interface to a web service that is remotely executed. Moreover, the applications 116 may be a child or sub-module of another software module (not illustrated).

The configuration files 118 can include any suitable parameters, variables, policies, algorithms, instructions, settings, or rules for configuring software of the device 102. For example, the configuration files 118 may include a table that identifies settings for one or more applications 116. In some implementations, the configuration files 118 identify initial settings for one or more applications 116, and for other types of applications such as operating system settings. The configuration files 118 may be written in any suitable format, such as, for example, ASCII and line-oriented, etc.

The policies 120 may include any parameters, variables, policies, algorithms, instructions, settings, or rules for enabling or preventing cross-perimeter access. For example, the policies 120a may identify a resource external to the perimeter 110a that is accessible by a resource inside the perimeter 110a. A policy of a given perimeter may include or otherwise identify the accessibility of the perimeter generally, the accessibility of specific resource in the perimeter, the ability of resources in the perimeter to access other perimeters, and other accessibility information. A policy may specify accessibility by user, action type, time period, or otherwise. In some implementations, a policy may identify specific resources of a perimeter that are accessible to external resources. For example, the policies 120a for the perimeter 110a may indicate that a specific application in another perimeter 110b may or may not access the data or resources in the first perimeter 110a. As another example, the policies 120a for the perimeter 110a may indicate that any of the applications in the other perimeters 110b or 110c may or may not access the data or resources in the first perimeter 110a.

In some implementations, a policies 120 may define or otherwise identify a process for user authentication. For example, the policies 120 may identify the type and content of user authentication (e.g., password strength, lifecycle) to apply to a cross-perimeter request. When a user requests access to multiple perimeters, the request may be evaluated by the policies of both perimeters. In some instances, if both policies grant access, then the cross-perimeter request may be granted. The policies may identify or include information to determine which network access resources can be used by an external resource in a different perimeter.

The device 102 may be connected to multiple networks, such as the enterprise network 104a and the other networks 104b. The enterprise network 104a is a network associated with an enterprise. The enterprise network 104a can include a wireless network, a virtual private network, a wired network, or any suitable network. The enterprise can be a corporate or business entity, a government body, a non-profit institution, or any other organization. The enterprise may be the device owner 105. The enterprise may also lease the device 102 or may hire contractors or agents who are responsible for maintaining, configuring, controlling, or managing the device 102. The other networks 104b can include any suitable networks that are accessible by a user. For example, the other networks can include a public network that the user has an account for, a private network, an ad hoc network, or another type of network. In some cases, the other networks 104b include a cellular data network. In some cases, the other networks 104b include a user's home network.

In some instances, each network is associated with one or more perimeters. For example, the perimeter 110a can be an enterprise perimeter, and the network access resources 114a can provide access to the enterprise network 104a; the perimeter 110b can be a personal perimeter, and the network access resources 114b can provide access to the other networks 104b. As such, all of the applications 116a in the first perimeter 110a can access the enterprise network resources, and all of the applications 116b in the second perimeter 110b can access the other network resources.

In some cases, the policies 120a indicates whether external resources (e.g., applications in the other perimeters 110b and 110c) can access the network resources in the first perimeter 110a, and the policies 120b of the second perimeter 110b indicates whether the applications 116b in the second perimeter 110b can access network resources of the first perimeter 110a. In the example where the first perimeter 110a is an enterprise perimeter and the second perimeter 110b is a personal perimeter, both sets of policies 120a and 120b may be used to determine whether the personal applications 116b can access the enterprise network 104a.

The networks 104a and 104b facilitate communication with the device 102. Either of the networks 104a and 104b may communicate, for example, Internet Protocol (IP) packets, Frame Relay frames, Asynchronous Transfer Mode (ATM) cells, voice, video, data, and other suitable information between network addresses. In addition, while the enterprise network 104a and the other networks 104b are each illustrated as a single network, each network may include multiple networks and may provide access to additional networks. In short, the enterprise network 104a and the other networks 104b may include any suitable network configured to communicate with the device 102.

Figure 2:
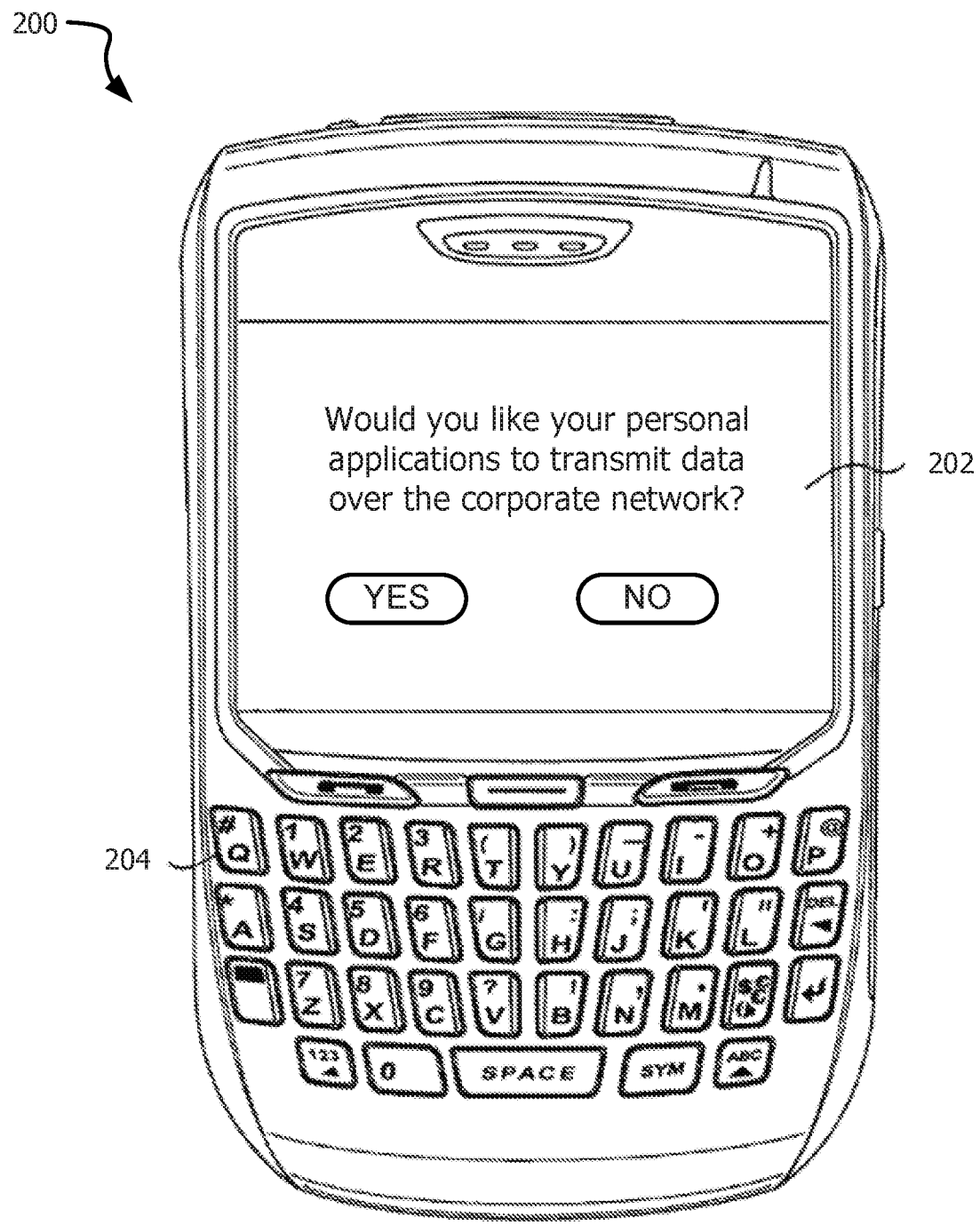
FIG. 2 is a diagram showing an example mobile device.

FIG. 2 is a diagram showing an example user device 200. As shown in FIG. 2, a user control may be provided so that the user can indicate whether to allow personal applications to transmit data over a corporate network. The example user device 200 shown in FIG. 2 includes a display 202, a keyboard 204, and additional features. A user device may include additional or different features.

The display 202 can prompt the user to make a selection using the prompt shown in FIG. 2. A different type of prompt—which may include additional or different language, a different format or graphical style, different selectable elements or options, as appropriate—may be used. The display 202 may provide additional or different information as part of the user prompt. In the example shown, the user can select "YES" or "NO" in response to the prompt. For example, the user selection may be provided through a user's interaction with a touchscreen, a keystroke, a stylus or pointing device, or by another type of user action.

In response to the user selection, the user device 200 may modify a policy or setting of the device 200. For example, if the user selects "YES," the device 200 can update a policy to allow applications in a personal perimeter to access corporate network resources; or if the user selects "NO," the device 200 can update a policy to prevent applications in a personal perimeter from accessing corporate network resources. In some instances, the user selection can be stored on the device 200. The device 200 can route data based on the user selection, for example, based on a policy that has been updated in response to the user selection. For example, data traffic associated with personal applications on the device 200 may be routed through the corporate network or through a non-corporate network based on the user selection.

In response to the user selection, the user device 200 may provide additional or different information to the user. For example, if the user selects "YES," the display 202 can inform the user that the user's personal data may be visible by personnel or administrators associated with the corporate entity; or if the user selects "NO," the display 202 can inform the user that the user's may incur personal data charges for any personal data traffic.

Figure 3:
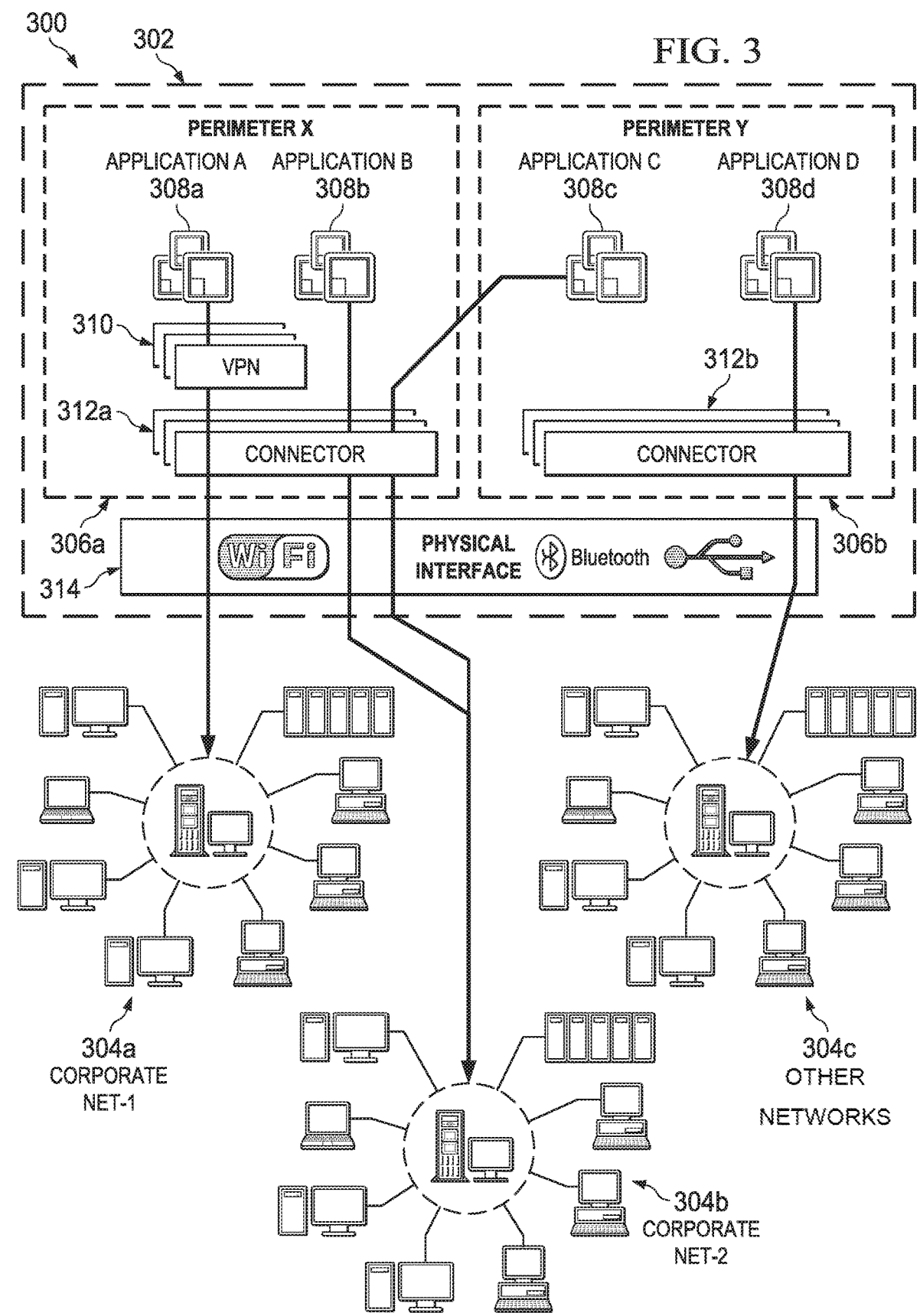
FIG. 3 is a schematic diagram showing example uses of network resources on a mobile device.

FIG. 3 is a schematic diagram showing example uses of network resources by a mobile device. The example uses shown in FIG. 3 may occur at different times, or they may occur concurrently. In the example shown, the device 302 is configured to communicate with corporate networks 304a and 304b and a non-corporate network 304c. The corporate networks 304a and 304b can include a virtual private network of an enterprise, a private Wi-Fi network of an enterprise, a wired network of the enterprise, or another network that is administered by the enterprise. The non-corporate network can include, for example, a publicly-accessible Wi-Fi network, a cellular data network, a personal wireless network, or another type of network. The device 302 includes an enterprise perimeter 306a and a personal perimeter 306b. The enterprise perimeter 306a includes the enterprise applications 308a and 308b, and the personal perimeter 306b includes the personal applications 308c and 308d. The enterprise perimeter 306a includes virtual private network data 310 and enterprise connection data 312a. The personal perimeter includes other connection data 312b.

The device 302 can access the corporate networks 304a and 304b using the network resources of the enterprise perimeter 306a, and the device can access the non-corporate network 304c using the network resources of the personal perimeter 306b. Each of the networks 304a, 304b, and 304c may, in some cases, provide access to other systems. For example, one or more of the networks 304a, 304b, and 304c may provide Internet access for the device 302. Some networks may only provide access to specific servers, databases, or systems. For example, the corporate network 304a may provide access only to corporate e-mail servers. The device 302 may be connected to any of the networks 304a, 304b, and 304c through any suitable component or components of the physical interface 314. The connection hardware may include, for example, a Wi-Fi connection, a cellular connection, Bluetooth, Universal Serial Bus (USB), Radio Frequency Identification (RFID), Near Field Communication (NFC), or other connection technologies.

The virtual private network data 310 provides secure connectivity with the corporate network 304a. In the example shown in FIG. 3, the virtual private network data 310 are used to route enterprise data traffic for the enterprise application 308a to the corporate network 304a. The enterprise connection data 312a in the enterprise perimeter 306a provides connectivity with the corporate network 304b, and the other connection data 312b in the personal perimeter 306b provides connectivity with other networks 304c. In the example shown in FIG. 3, the enterprise connection data 312a are used to route enterprise data traffic for the enterprise application 308b to the corporate network 304b, and enterprise connection data 312a are also used to route personal data traffic for the personal application 308c to the corporate network 304b. For example, the personal application 308c may be a web-based application (e.g., online game, social networking application) that accesses the Internet through the corporate network 304b. As shown in FIG. 3, the other connection data 312b are used to route personal data traffic for the personal application 308d to the other networks 304c.

In some implementations, the connection data 312a and 312b may include encryption information, network settings and information, passwords, certificates, and other data. Each perimeter may include a policy for applications and network resources within the perimeter, outside the perimeter, or both. In some cases, the device 302 includes a policy that allows personal applications in the personal perimeter 306b to access the corporate networks 304a and 304b. A user of the device may indicate whether to prevent the personal applications from accessing the corporate networks 304a and 304b. In some instances, the personal applications 308c and 308d are prohibited from accessing the corporate networks 304a and 304b based on the user's indication. In some instances, the personal applications 308c and 308d are allowed to access the corporate networks 304a and 304b based on the user's indication.

FIG. 4 is a flow chart showing an example process 400 for managing use of network resources on a mobile device. The process 400 can be implemented by a user device in a communication system. For example, the process 400 can be implemented by the device 102 shown in FIG. 1, the device 200 shown in FIG. 2, the device 302 shown in FIG. 3, or by another type of system or module. The example process 400 shown in FIG. 4 can be implemented using additional, fewer, or different operations, which can be performed in the order shown or in a different order. In some implementations, one or more of the operations can be repeated or iterated, for example, until a terminating condition is reached.

The process 400 can be implemented on a user device that includes multiple perimeters. For example, the example operations in the process 400 are described with respect to a first perimeter and a second perimeter. The perimeters can be defined and implemented in any suitable manner, and each perimeter may include any suitable data, applications, policies, and other resources. Each perimeter may include its own policy or other data that defines rules for accessing resources associated with the perimeter. For example, a first perimeter on the device may include a first policy that defines rules for accessing resources (e.g., applications, data, network resources, etc.) associated with the first perimeter, and the second perimeter may include a second policy that defines rules for accessing resources (e.g., applications, data, network resources, etc.) associated with the second perimeter. A device may include any suitable number of perimeters (e.g., 1, 2, 3, 4, or more).

In some implementations, the user device includes a personal perimeter associated with a user of the device. A device may include multiple personal perimeters, and each personal perimeter can be associated with the same user, or they may each be associated with different users. For example, multiple users may be authorized to use the device, and each user may have his or her own personal perimeter on the device. In some implementations, the user device includes an enterprise perimeter associated with an enterprise (e.g., business, corporation, partnership, or other enterprise). For example, the enterprise may own the device and assign the device to a particular user. An enterprise administrator may setup the device policies or configure the device for enterprise use. In some instances, the user device includes multiple enterprise perimeters. Each enterprise perimeter can be associated with the same enterprise, or they may each be associated with different enterprises. For example, the user may own the device and have perimeters for each enterprise he or she is associated with.

At 410, the device receives a user's indication to allow applications in a first perimeter to access network resources in a second perimeter; alternatively, the device may receive a user's indication to disallow applications in a first perimeter from accessing network resources in a second perimeter. The first perimeter on the device may include multiple applications, and the second perimeter on the device may include multiple network resources. The user's indication can be an indication to allow any application in the first perimeter to access any network resource in the second perimeter. Or the user's indication can be an indication not to allow any application in the first perimeter to access any network resource in the second perimeter. As such, the user may or may not indicate a particular application or a particular network resource. Instead, the user can indicate generally that none of the applications in the first perimeter is permitted to access network resources associated with the second perimeter, or the user can indicate generally that all of the applications in the first perimeter are permitted to access network resources associated with the second perimeter.

The applications in the first perimeter may include any suitable applications (e.g., calendar, e-mail, games, tools, etc.). The network resources in the second perimeter may include any suitable network resources (e.g., virtual private network account, Wi-Fi access data, etc.). In cases where the first perimeter is a personal perimeter and the second perimeter is an enterprise perimeter, the user's indication can be an indication to allow or disallow personal data traffic to be routed on an enterprise network.

The user's indication can be obtained in any suitable manner. In some cases, the user's indication is obtained in response to the device determining that the second perimeter allows the applications in the first perimeter to access the network resource in the second perimeter. For example, the second perimeter may include a policy that allows other perimeters to access network resources of the second perimeter. In cases where the first perimeter is a personal perimeter and the second perimeter is an enterprise perimeter, the device may determine that an enterprise policy allows a user to route her or his personal data traffic on the enterprise network. In some cases, the user's indication is obtained through a user interface presented to the user. For example, a user interface may provide the user the option to select whether to allow applications in the first perimeter to access network resource in the second perimeter, and the user's indication received at 410 can be the user selection that is received through the user interface.

At 420, outbound data are received from an application in the first perimeter. The outbound data can be received from any application in the first perimeter. The outbound data can include any suitable information to be sent from the device. The outbound data may include addressing or routing information. For example, the outbound data may include a header with an IP address, an e-mail address, a uniform resource locator (URL), a memory or hardware address, or any suitable combination of one or more of these. In some instances, the outbound data is an e-mail from an e-mail application in the first perimeter. In some instances, the outbound data is a URL from a browser application in the first perimeter. In some instances, the outbound data is application-specific data from an internet application in the first perimeter. The outbound data can be received internally on the user device, and the outbound data can be designated for transmission to an external target destination.

At 430, it is determined whether the user indicated to allow applications in the first perimeter to access network resources in the second perimeter. The determination can be made by accessing one or more policies of the device. If the device has received the user's indication to allow applications in the first perimeter to access network resources in the second perimeter, the example process 400 proceeds to 440. In some cases, if the device has not received the user's indication to allow applications in the first perimeter to access network resources in the second perimeter, the process 400 proceeds to 450. If the device has received the user's indication to disallow applications in the first perimeter from accessing network resources in the second perimeter, the example process 400 proceeds to 450. In some implementations, the process 400 may proceed in a different manner, or the process may proceed based on additional or different information. For example, if none of the network resources in the second perimeter is available, the process 400 may proceed to 450 regardless of the user's indication.

At 440, the outbound data are routed to a network resource in the second perimeter. In cases where the second perimeter includes multiple network resources, the outbound data can be routed to any suitable network resource in the second perimeter. When multiple network resources in the second perimeter are available, a particular network may be selected. For example, the particular network resource can be selected based on a policy of the first perimeter, a policy of the second perimeter, user settings, network settings, network traffic, or other considerations. As an example, the outbound data can be routed to a virtual private network associated with the second perimeter, to a wireless (or wired) local area network associated with the second perimeter, to an ad hoc network associated with the second perimeter, to a cellular network associated with the second perimeter, or to another type of network resource.

At 450, the outbound data are routed to another network resource that is not in the second perimeter. For example, the outbound data may be routed to a network resource in the first perimeter or to another perimeter. When multiple network resources outside of the second perimeter are available, a particular network may be selected. For example, the particular network resource can be selected based on a policy of the first perimeter, a policy of another perimeter, user settings, network settings, network traffic, or other considerations. As an example, the outbound data can be routed to a virtual private network associated with the first perimeter, to a wireless (or wired) local area network associated with the first perimeter, to an ad hoc network associated with the first perimeter, to a cellular network associated with the first perimeter, to a network resource associated with another perimeter (e.g., a third or fourth perimeter), or to another type of network resource.

In some cases, routing the outbound data does not directly depend on availability of network resources. The decision to route outbound data away from the network resources of the second perimeter may be made independent of network availability. For example, outbound data can be routed to a network resource outside of the second perimeter even though network resources in the second perimeter are available (e.g., while the device is connected to a network associated with the second perimeter). As another example, outbound data can be routed to a network resource outside of the second perimeter even when no network resources outside of the second perimeter are currently available. In such instances, the outbound data can be held until another network resource is available. Accordingly, in some instances the user's indication to disallow applications in the first perimeter to access network resources in the second perimeter can override other considerations. For example, the process 400 may result in the device routing data based on who owns or operates a particular network resource, rather than on the speed and availability of the network. Such routing can, in some instances, give the user flexibility to control whether a particular network resource provider (e.g., an employer or customer) has access to data from particular perimeters (e.g., a personal perimeter) on the user device. Such routing may also allow the user to control data traffic without altering (e.g., disconnecting) connectivity with corporate networks.

At 440 or at 450 (or both), the user device may perform all operations for routing the outbound data. In some cases, the user device routes the outbound data by adding or modifying routing information in the outbound data, or the user device may route the outbound data by adding a header or additional addressing information to the outbound data. Routing the outbound data may or may not include transmitting the outbound data from the user device. In some implementations, routing the outbound data includes transmitting the outbound data to an external communication system (e.g., an enterprise network, a cellular data service provider).

FIG. 5 is a flow chart showing an example process 500 for managing use of corporate network resources on a mobile device. The process 500 can be implemented by a user device in a communication system. For example, the process 500 can be implemented by the device 102 shown in FIG. 1, the device 200 shown in FIG. 2, the device 302 shown in FIG. 3, or by another type of system or module. The example process 500 shown in FIG. 5 can be implemented using additional, fewer, or different operations, which can be performed in the order shown or in a different order. In some implementations, one or more of the operations can be repeated or iterated, for example, until a terminating condition is reached.

The process 500 can be implemented in any appropriate context. In some implementations, the process 500 is implemented on a device that is used for both personal use and business use. For example, the process 500 can be implemented on a device that has been issued to an employee by an employer, and the employer may permit the employee to use the device for both business use (e.g., for activities related to employment) and personal use (e.g., for activities not related to employment). Business use may include, for example, using a corporate e-mail account, using corporate software applications, using a corporate calendar, accessing a corporate database or other corporate resources. Personal user may include, for example, using a personal e-mail account, using personal software applications, using a personal calendar, accessing the Internet or personal resources. In some examples, the process 500 can be implemented on a user's personally-owned device that has been configured for both business and personal use. In some instances, the process 500 can be implemented on a device that has been configured for personal use by multiple different users, for use business use with multiple different enterprises, or any suitable combination. In some cases, the device includes one or more personal perimeters and one or more corporate perimeters.

At 510, it is determined that a corporate policy permits personal data traffic on the corporate network. For example, a corporate administrator can implement or modify a corporate policy that permits a device to use the corporate network for personal data traffic. The policy may specify a particular set of applications or other resources that can use the corporate network resources; the policy may indicate generally that there are no restrictions on how the device may use corporate network resource; or the policy may permit personal data traffic on the corporate network in another suitable manner. The policy may specify a particular set of corporate network resources that can be used for personal traffic; the policy may indicate generally that there are no restrictions on the use of corporate network resources; or the policy may permit personal data traffic on the corporate network in another suitable manner.

Personal applications may generally include any personal software, modules, applications, data, or other personal resources on the device. In some instances, personal applications include a personal e-mail account, a personal e-mail software, a personal calendar application, web-based applications for personal use, games, tools, and others. Personal applications may be designated as personal applications (e.g., as part of a personal perimeter on the device) that are associated with a particular user. In addition to personal applications, the device may also include corporate applications. In some instances, corporate applications include a corporate e-mail account, a corporate e-mail software, a corporate calendar application, web-based applications for corporate use, tools, and others. Corporate applications may be designated as corporate applications (e.g., as part of a corporate perimeter on the device) that are associated with a particular enterprise.

Corporate network resources may generally include any corporate network, network connectivity hardware or software, corporate network access data or network accounts, or other types of corporate network resources. In some instances, corporate network resources include a corporate virtual private network (VPN), a corporate wireless network, corporate network hardware, corporate network software modules, and others. Network resources may be designated as corporate network resources (e.g., as part of a corporate perimeter on the device) that are associated with a particular entity. In addition to corporate network resources, the device may also include additional network resources. In some instances, the device may include software, hardware, configuration data, or access settings for a personal wireless local area network, a personal cellular data account, a personal short-range wireless device (e.g., Bluetooth devices), a public ad hoc network, etc. Network resources may be designated as personal network resources (e.g., as part of a personal perimeter on the device) that are associated with a particular user.

At 520, a user control is provided for the user to allow or disallow the user's personal data traffic to be carried on the corporate network. The user control may be provided in a graphical user interface, for example, on a touchscreen or another type of display, or the user control can be provided in any other suitable manner. The user control can be provided as part of a settings or configurations menu that the user can access at any time during operation of the device. Additionally or alternatively, the user control can be provided as part of an initial device configuration setup of the device.

The user can make a selection through the user control. The user can provide his or her selection, for example, by interacting with a touchscreen, by a keystroke, or by any other suitable action. The user interface can detect the user's selection and process the detected information. For example, the user's selection can be converted to any suitable format (e.g., binary, etc.); information representing the user's selection can be stored, processed, communicated, etc. In some instances, the user's selection is stored in memory and retrieved by a processor, for example, at a later time.

In some cases, the device can provide feedback to the user in response to the user's selection. For example, the device may provide a confirmation message or a warning about security or other implications of the user's selection. In some instances, the device may inform the user that the user has indicated to allow personal data to be carried by the enterprise network, and the device may warn the user that the user's personal data traffic may be visible to enterprise administrators or personnel. In some instances, the device may inform the user that the user has indicated not to allow personal data to be carried by the enterprise network, and the device may warn the user that network availability for the user's personal data traffic may be limited due to the user's selection. Additional or different types of feedback may be provided to the user, as appropriate.

At 530, it is determined whether the user has disallowed the user's personal data traffic to be transmitted over the corporate network. The determination can be made by accessing one or more policies of the device. The determination at 530 can be based on a user selection received at 520; or the determination can be made based on additional or different information. If the user has disallowed the user's personal data traffic on the corporate network, the example process 500 proceeds to 550. In some cases, if the user has not allowed the user's personal data traffic on the corporate network, the process 500 may proceed to 550. If the user has not disallowed the user's personal data traffic on the corporate network, the example process 500 proceeds to 540. In some implementations, the process 500 may proceed in a different manner. For example, if none of the corporate network resources is available, the process 500 may proceed to 550 regardless of the user's indication.

Personal data traffic may include any data traffic designated as personal to the user. In some cases, personal data traffic includes information relating to, generated by, or directed to a personal application on the mobile device. Personal data traffic may include personal files or data stored on the mobile device, such personal files or data may or may not be associated with a personal application. In some instances, personal data traffic includes all non-corporate data traffic. Personal data traffic may include any data traffic on the device that relates to a personal perimeter or policy on the device.

Personal data traffic may include inbound and outbound data. For example, personal data traffic may include information requested by the device or retrieved to the device by a personal application; and personal data traffic may include information from a personal application to be transmitted from the device. Inbound and outbound personal data traffic may be routed through a corporate network, or they may be routed through a non-corporate network.

At 540, personal data traffic is routed through the corporate network. The personal data traffic may be routed through the corporate network by any suitable technique. In some cases, routing data through the corporate network is accomplished by designating outbound data to be transmitted over a virtual private network of the corporate enterprise, by designating outbound data to be transmitted over a wireless network of the corporate enterprise, by designating outbound data to be transmitted using a wireless account or wireless device associated with the corporate enterprise, etc.

Routing data may include appending or modifying a header of a data packet, adding or modifying addressing or routing data of a message, or other operations. In some instances, all of the operations required to route the data to a particular network can be performed by the user device. In some cases, routing the data may or may not include transmitting the data from the device, for example, using a wired or wireless connection.

At 550, personal data traffic is routed through a non-corporate network. The non-corporate network can be a personal network or another type of data network. The personal data traffic may be routed through the non-corporate network by any suitable technique. In some cases, routing data through the non-corporate network is accomplished by designating outbound data to be transmitted over a public network, by designating outbound data to be transmitted over a personal wireless network, by designating outbound data to be transmitted using a personal wireless account or personal wireless device, etc.

In some instances, personal data traffic is routed through a non-corporate network even when a corporate network is available and actively being used by the device for corporate data traffic. As such, personal data traffic can be routed through a non-corporate network without disconnecting from the corporate network. In other words, in some implementations the device routes data traffic based on the type of data traffic, rather than network availability. For instance, personal data traffic can be routed through non-corporate communication channels, and corporate data traffic can be routed through corporate communication channels. Such segregation may allow a user more privacy for personal data traffic, while also allowing use of corporate resources for corporate data traffic. Added flexibility for the user may be provided by a user control that allows the user to choose whether data traffic will be segregated in this manner.

In a general aspect, use of network resources on a device is managed. The network usage may be managed based on user input received at the device.

In some aspects, an indication is received from user input at the device. The indication indicates whether to allow an application associated with a first perimeter on the device to access a network resource associated with a second perimeter on the device. Outbound data are received from the application associated with the first perimeter. It is determined, according to the indication from the user input, whether to route the outbound data to the network resource associated with the second perimeter.

Implementations of these and other aspects may include one or more of the following features. The first perimeter includes multiple applications, data, and network resources. The second perimeter includes multiple applications, data, and network resources. The indication comprises an indication to allow any application associated with the first perimeter to access any network resource associated with the second perimeter, and the outbound data are routed to one of the network resources associated with the second perimeter. The indication comprises an indication not to allow any application associated with the first perimeter to access any network resource associated with the second perimeter, and the outbound data are routed to a network resource associated with the first perimeter. The outbound data are routed to a network resource associated with the first perimeter while the network resource associated with the second perimeter is available to applications associated with the second perimeter.

Additionally or alternatively, implementations of these and other aspects may include one or more of the following features. In response to determining that the second perimeter includes a policy that allows the application associated with the first perimeter to access the network resource associated with the second perimeter, a user interface is presented on the device. The user interface allows a selection whether to allow the application associated with the first perimeter to access the network resource associated with the second perimeter. The indication includes a user selection received through the user interface.

Additionally or alternatively, implementations of these and other aspects may include one or more of the following features. The first perimeter includes a first policy that defines rules for accessing resources associated with the first perimeter. The second perimeter includes a second policy that defines rules for accessing resources associated with the second perimeter. The first perimeter is a personal perimeter associated with a user of the device. The second perimeter is an enterprise perimeter associated with an enterprise. The indication is an indication whether to allow data from the personal perimeter to be transmitted over an enterprise communication system. The enterprise communication system includes a virtual private network of the enterprise, a wireless local area network of the enterprise, or both.

A number of implementations have been described. Nevertheless, it will be understood that various modifications may be made. Other variations in the order of steps are also possible. Accordingly, other implementations are within the scope of the following claims.

What is claimed is:

1. A method of managing use of network resources on a device, the method comprising:
   receiving, at the device, outbound data from an application associated with a first group of logically separate resources, while the device is connected to both a first network and a second network, wherein the device includes the first group of logically separate resources and a second group of logically separate resources, the first group of logically separate resources includes a first network resource for accessing the first network, the second group of logically separate resources includes a second network resource for accessing the second network, and the first network is different than the second network;
   in response to receiving the outbound data from the application associated with the first group of logically separate resources, outputting, on the device, a graphic user interface that requests a user input indicating whether to allow the application associated with the first group of logically separate resources to access the second network resource associated with the second group of logically separate resources; and
   in response to receiving the user input indicating whether to allow the application associated with the first group of logically separate resources to access the second network resource associated with the second group of logically separate resources, determining, according to the user input, whether to route the outbound data received from the application associated with the first group of logically separate resources to the second network using the second network resource associated with the second group of logically separate resources while the device is connected to both the first and the second networks.

2. The method of claim 1, wherein the first group of logically separate resources includes multiple applications, the second group of logically separate resources includes multiple network resources, and the method further comprises routing the outbound data using the second network resource associated with the second group of logically separate resources.

3. The method of claim 1, further comprising: determining that the second group of logically separate resources includes a policy that allows any applications associated with the first group of logically separate resources to access one or more network resources associated with the second group of logically separate resources; and wherein the graphic user interface is outputted in response to the determining that the second group of logically separate resources includes the policy.

4. The method of claim 1, wherein the first group of logically separate resources includes a first policy that defines rules for accessing resources associated with the first group of logically separate resources, and the second group of logically separate resources includes a second policy that defines rules for accessing resources associated with the second group of logically separate resources.

5. The method of claim 1, wherein the first group of logically separate resources comprises a personal group of logically separate resources associated with a user of the device, and the second group of logically separate resources comprises an enterprise group of logically separate resources associated with an enterprise.

6. The method of claim 5, wherein the enterprise group of logically separate resources includes parameters for accessing at least one of a virtual private network of the enterprise or a wireless local area network of the enterprise.

7. A device comprising:
   a first group of logically separate resources that includes an application and a first network resource for accessing a first network;
   a second group of logically separate resources that includes a second network resource for accessing a second network, and the first network is different than the second network;
   a user interface operable to, in response to receiving outbound data from the application associated with the first group of logically separate resources, while the device is connected to both the first network and the second network, output a graphic user interface requests a user input indicating whether to allow the application associated with the first group of logically separate resources to access the second network resource associated with the second group of logically separate resources; and
   one or more hardware data processing apparatus operable to:
     receive the outbound data from the application associated with the first group of logically separate resources; and
     in response to receiving the user input indicating whether to allow the application associated with the first group of logically separate resources to access the second network resource associated with the second group of logically separate resources, determine, according to the user input, whether to route the outbound data received from the application associated with the first group of logically separate resources to the second network using the second network resource associated with the second group of logically separate resources while the device is connected to both the first and the second networks.

8. The device of claim 7, wherein the first group of logically separate resources includes multiple applications, the second group of logically separate resources includes multiple network resources, and the one or more hardware data processing apparatus is operable to route the outbound data using the second network resource associated with the second group of logically separate resources in response to the determining.

9. The device of claim 7, wherein the one or more hardware data processing apparatus is operable to:
   determine that the second group of logically separate resources includes a policy that allows any applications associated with the first group of logically separate resources to access one or more network resources associated with the second group of logically separate resources; and
   output the graphical user interface that enables the user input.

10. The device of claim 7, wherein the first group of logically separate resources comprises a personal group of logically separate resources associated with a user of the device, and the second group of logically separate resources comprises an enterprise group of logically separate resources associated with an enterprise.

11. The device of claim 10, further comprising a communication interface operable to communicate with an enterprise communication system.

12. A non-transitory computer-readable medium comprising instructions that are operable when executed to cause one or more hardware data processing apparatus to perform operations comprising:
   receiving, at a device, outbound data from an application associated with a first group of logically separate resources while the device is connected to both a first network and a second network, wherein the device includes the first group of logically separate resources and a second group of logically separate resources, the first group of logically separate resources includes a first network resource for accessing the first network, the second group of logically separate resources includes a second network resource for accessing the second network, and the first network is different than the second network;
   in response to receiving the outbound data from the application associated with the first group of logically separate resources, outputting, on the device, a graphic user interface that requests a user input indicating whether to allow the application associated with the first group of logically separate resources to access the second network resource associated with the second group of logically separate resources; and
   in response to receiving the user input indicating whether to allow the application associated with the first group of logically separate resources to access the second network resource associated with the second group of logically separate resources, determining, according to the user input, whether to route the outbound data received from the application associated with the first group of logically separate resources to the second network using the second network resource associated with the second group of logically separate resources while the device is connected to both the first and the second networks.

13. The non-transitory computer-readable medium of claim 12, wherein the first group of logically separate resources includes multiple applications, the second group of logically separate resources includes multiple network resources, and the operations further comprises routing the outbound data using the second network resource associated with the second group of logically separate resources.

14. The non-transitory computer-readable medium of claim 12, wherein the operations further comprise determining that the second group of logically separate resources includes a policy that allows any applications associated with the first group of logically separate resources to access one or more network resources associated with the second group of logically separate resources; and wherein the graphic user interface is outputted in response to the determining that the second group of logically separate resources includes the policy.

15. The non-transitory computer-readable medium of claim 12, wherein the first group of logically separate resources comprises a personal group of logically separate resources associated with a user of the device, and the second group of logically separate resources comprises an enterprise group of logically separate resources associated with an enterprise.

* * * * *

UNITED STATES PATENT AND TRADEMARK OFFICE
CERTIFICATE OF CORRECTION

PATENT NO. : 11,032,283 B2  
APPLICATION NO. : 15/180911  
DATED : June 8, 2021  
INVENTOR(S) : Christopher Ryerson et al.

Page 1 of 1

It is certified that error appears in the above-identified patent and that said Letters Patent is hereby corrected as shown below:

In the Claims

In Column 16, Line 45, in Claim 7, after "interface" insert -- that --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*